United States Patent
Nigam et al.

(10) Patent No.: US 11,184,459 B2
(45) Date of Patent: Nov. 23, 2021

(54) METHOD AND SYSTEM FOR A NETWORK PRESENCE PLATFORM WITH INTELLIGENT ROUTING

(71) Applicant: Bungee Tech Corporation, Redmond, WA (US)

(72) Inventors: Rajat Nigam, Redmond, WA (US); Ilya Polkovnichenko, Redmond, WA (US); Inez Raharjo, San Francisco, CA (US); Charles Ding, Bellevue, WA (US)

(73) Assignee: Bungee Tech Corporation, Sammamish, WA (US)

( * ) Notice: Subject to any disclaimer, the term of this patent is extended or adjusted under 35 U.S.C. 154(b) by 8 days.

(21) Appl. No.: 16/528,513

(22) Filed: Jul. 31, 2019

(65) Prior Publication Data

US 2020/0045131 A1 Feb. 6, 2020

Related U.S. Application Data

(60) Provisional application No. 62/712,920, filed on Jul. 31, 2018.

(51) Int. Cl.
  *H04L 29/08* (2006.01)
  *H04L 12/24* (2006.01)

(52) U.S. Cl.
  CPC ............ *H04L 67/32* (2013.01); *H04L 41/024* (2013.01)

(58) Field of Classification Search
  None
  See application file for complete search history.

(56) References Cited

U.S. PATENT DOCUMENTS

| | | | | |
|---|---|---|---|---|
| 5,265,239 A * | 11/1993 | Ardolino | ................ | G06F 13/10 709/203 |
| 5,530,905 A * | 6/1996 | Nichols | .................... | H04L 29/00 709/203 |
| 6,717,944 B1 * | 4/2004 | Bryden | ............... | H04L 12/4633 370/392 |
| 6,765,908 B1 * | 7/2004 | Chen | .................. | H04Q 11/0478 370/392 |
| 7,489,681 B1 * | 2/2009 | Aggarwal | ........... | H04L 45/7457 370/389 |
| 9,660,895 B1 * | 5/2017 | Bennett | ................. | H04W 40/20 |

(Continued)

OTHER PUBLICATIONS

International Search Report and Written Opinion dated Jan. 22, 2020 for PCT Appln. No. PCT/US19/44564.

*Primary Examiner* — Younes Naji
(74) *Attorney, Agent, or Firm* — Vista IP Law Group, LLP

(57) ABSTRACT

A computer program product, system, and method for accessing an application from different locations to gather geo-location specific data via pre-provisioned network endpoints in the different locations, the method includes receiving a request from a client application to access an application via a particular geographical location to collect geo-location specific data via a pre-provisioned network endpoint in the particular location, selecting a route to send traffic via the particular geographical location using the pre-provisioned network endpoint, establishing a virtual circuit to route the request via a network endpoint, sending the request for execution to the network endpoint, collecting responses received from the network endpoint from accessing the application, and sending the responses to the client application.

30 Claims, 35 Drawing Sheets

(56) References Cited

U.S. PATENT DOCUMENTS

| | | |
|---|---|---|
| 2012/0321052 A1 | 12/2012 | Morrill et al. |
| 2015/0195182 A1* | 7/2015 | Mathur ............... H04L 41/0866 |
| | | 714/27 |
| 2016/0242024 A1 | 8/2016 | Karren et al. |
| 2017/0257392 A1* | 9/2017 | Ghosh ................... G06F 16/958 |
| 2019/0028552 A1* | 1/2019 | Johnson, II ............. H04L 67/02 |

* cited by examiner

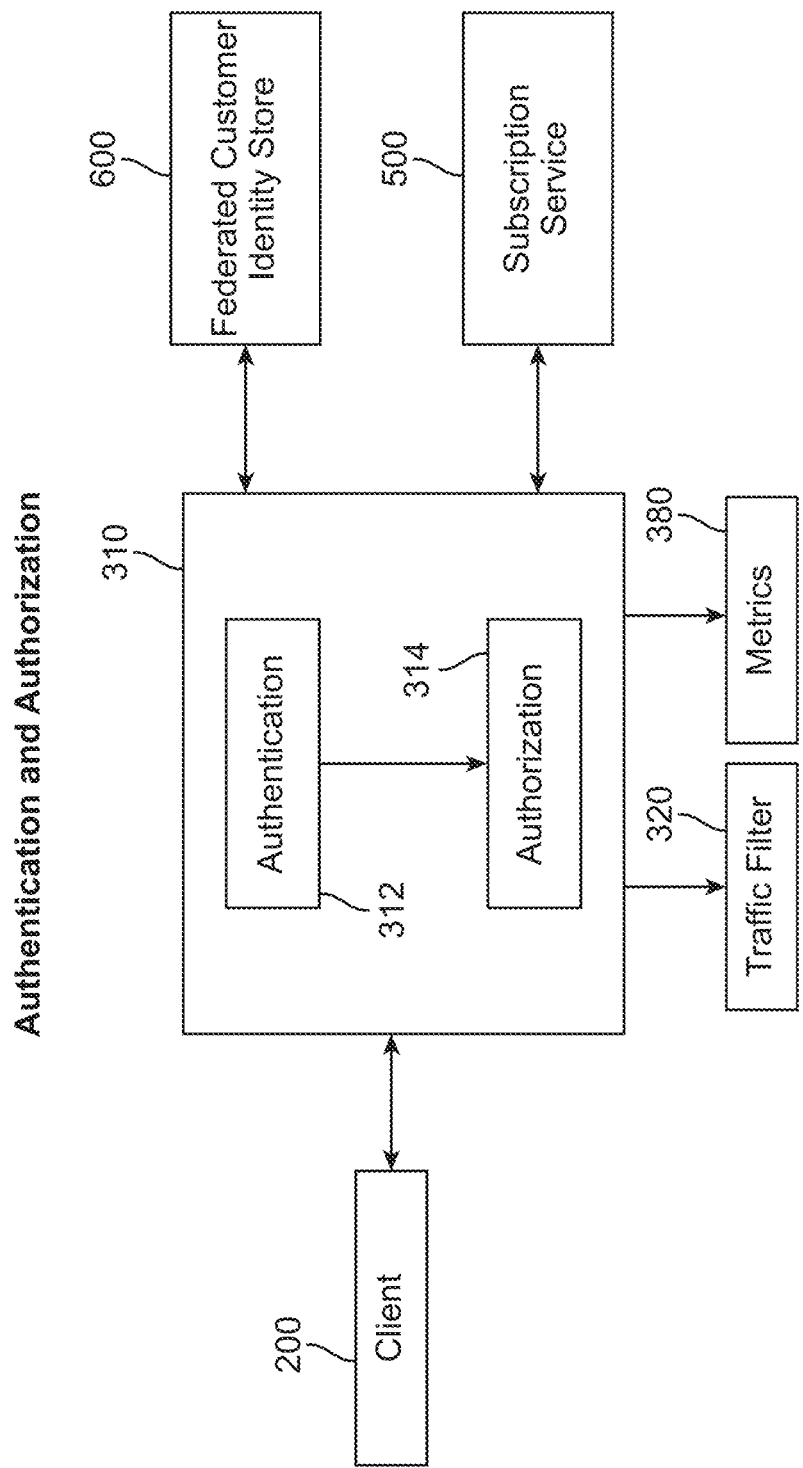

Search Results Loaded 200 out of 13405767 Matched [Load next 200]

[Copy] [Excel] [PDF] [Column visibility]

| httpVerb↕ | sessionId↕ | Start Time ↕ | webDomain↕ | url ↕ | contentType↕ | ipUsed ↕ | responseStatusCode↕ | latency↕ | responseSize↕ | Page URL ↕ |
|---|---|---|---|---|---|---|---|---|---|---|
| GET | 19_15_31985359215 | Thursday, July 19th 2018, 12:29:36 am | No Result | | application/json | 173.211.38.206 | 200 | 202 | No Result | |
| GET | 19_15_31985359215 | Thursday, July 19th 2018, 12:29:36 | No Result | | image/jpeg | 173.211.38.206 | 200 | 34 | No Result | |

FIG. 6C

| Key Management Closed Beta v1.0.0 | 🔑 Key Management |
|---|---|
| 🔑 Active API Keys [Client Id: *TARGET_FPIGYa7q4eGohEJekJICLKMBuB8hOMzxFNT4_001*] | |

Show [10 ▼] entries    Search: [        ]

| Apikey ⇅ | Actions ⇅ |
|---|---|
| 2b33d38e-fa8d-4417-a2ad-191d3a249999 | [None] |
| 8dee9302-c30d-4c98-8d57-d04bc40159c2 | [None] |

Showing 1 to 2 of 2 entries                    [Previous] [1] [Next]

FIG. 6E

METHOD AND SYSTEM FOR A NETWORK PRESENCE PLATFORM WITH INTELLIGENT ROUTING

CROSS-REFERENCE TO RELATED APPLICATIONS

The present application claims the benefit of priority to U.S. Provisional Patent Application Ser. No. 62/712,920, entitled "METHOD AND SYSTEM FOR A NETWORK PRESENCE PLATFORM WITH INTELLIGENT ROUTING", filed Jul. 31, 2018, which is hereby incorporated by reference in its entirety.

FIELD

This disclosure concerns a method, a computer program product, and a computer system for a network presence platform with intelligent routing.

BACKGROUND

Many enterprise applications, online applications, software applications, mobile applications, etc. have use cases that require geographical ("geo") specific data. For example, for application testing, a developer may want to gather test observation data for his website performance from 500 different cities in the United States as if end-users are interacting with his website from the 500 different cities. Similarly, a search engine optimization ("SEO") focused developer may want to analyze local search results for a particular business, product, service, etc. from a large number of geographical locations to see where the business, product, service, etc. appear in the search results as compared with competitors. Furthermore, there are several other use cases such as, for example, internet-of-thing ("IOT") performance monitoring, retail competitive intelligence gathering and display ad analytics which all need data to be collected from different geographical locations/endpoints. Most importantly, it is increasingly becoming important to collect data mimicking real end-users from consumer grade networks, such as, for example, broadband and mobile networks. For example, testing website performance is not only required from, as an example, 500 cities, but also using last mile networks that consumers use in their homes to access the website.

Gathering geo specific data requires network endpoints to be provisioned in geographies from where the data needs to be collected. This is a hard problem to solve at scale. Thus, it is no surprise that while vertical applications may exist that provide the necessary workflows, provisioning network presence is often the onus of the customer. For example, there are plenty of applications and IOT performance monitoring software, both on-premise and software-as-a-service (SaaS), that are available. However, none can efficiently and effectively provide comprehensive coverage of network endpoints across the globe.

Some vertical applications offer limited network presence. However, the limited network presence is typically integrated as a part of the overall application solution and not available outside of the application's solution. For example, a testing solution provider may choose to provide network presence using cloud endpoints in a limited number of regions.

Getting geo-specific data requires routing traffic (supporting different protocols) via geo-specific network points of presence. Existing legacy solutions such as proxy networks, regional cloud based or datacenter-based networks provide primarily layer 2 ("L2") networking solutions to address this problem. Using these legacy solutions require developers to explicitly integrate these solutions and spend a significant amount of development time in managing these solutions. For example, managing proxy/VPN health, proxy/VPN uptime, managing a catalog of proxy/VPN nodes etc. comes at a significant operational and technical processing cost. Efforts of integrating these solutions with different applications requires dedicated efforts for each application.

Additionally, none of these legacy solutions provide application level control for controlling the routing of traffic. Working with vendors providing these legacy solutions or involving network engineering is the only solution to even adjust for minor routing changes as required by an application. Expansion to new geo-locations is expensive and while some proxy/VPN networks may provide some minimal global footprint, the reliability, uptime and performance is often a question of infrastructure capacity provisioned and never fully guarantees network coverage where a user needs it the most. Also, note that none of these legacy solutions provide diversity in terms of the actual networks that are used for routing the traffic, since these solutions use Dedicated Access to the Internet ("DIA") circuits, leased lines or other business grade connections. No options for using consumer grade networks like DSL lines, Cable connections or mobile connections are available.

Peer-to-peer ("P2P") networks provide a slight improvement to legacy solutions by improving coverage using geographically spread peers. But again, P2P suffers from issues such as lack of application control over routing traffic, support for multiple protocols and reliability and uptime and performance, which are direct function of peer quality in the network. Additionally, P2P networks may introduce privacy and security concerns which prevent serious long-term use for enterprise use cases.

Routing traffic, in addition to network points of presence, requires multiple controls to manage traffic flowing through to regional network endpoints. Load balancing traffic across nodes and any kind of traffic shaping (e.g., rate limiting, throttling, traffic filtering) are unfortunately currently on the onus of the developers to implement. Additionally, different applications may require different level of protocol support at the network endpoints for their traffic (e.g., HTTP(s), Ping, Traceroute etc.). Traditional legacy solutions, unless built to specifications, do not always guarantee this support.

Therefore, there is a need for an improved approach to implement a globally scalable network presence platform with intelligent routing that addresses the above-described problems.

SUMMARY

Embodiments of the present disclosure provide a computer program product, a computer system, and a method for a scalable routing platform that is tightly integrated with endpoint hardware and software to address the issues with the existing legacy approaches. This includes setting up or pre-provisioning smart network endpoints across the globe which are engineered to support multiple protocols for supporting multiple customer segments and their use cases. These endpoints employ multiple types of enterprise grade and consumer grade network connections. These endpoints are fronted by a cloud-based routing platform and then exposed via a simple software application programming interface ("API") that abstracts the complexities of hardware engineering and networking.

This combined distributed system may be referred to as the "Platform." The Platform may comprise a routing platform and an endpoint such that the Platform may be exposed to users via an API. The offered API (e.g., a RESTful API) may be implemented in a multitenant environment which can be used by multiple users. The API may be called within any customer application or program to provide network presence without individual users provisioning any hardware or networks. Additionally, the Platform, via the API, also provides developers and integrators granular software defined control of how their respective traffic should be routed via the different endpoints and leverage platform provided features for traffic shaping. Developers may access the API either using the software development kits ("SDKs") provided in one of many different languages or Internet browser extensions. In some embodiments, the endpoint may be implemented globally to provide a globally scalable network presence platform.

In one embodiment, a method for accessing an application from a different location than a location of a client application includes receiving a request from the client application to access an application via a particular geographical location to collect geo-location specific data via a network endpoint located in the particular geographical location. The method also includes selecting a route to send traffic via the particular geographical location using the network endpoint. The method further includes establishing a virtual circuit to route the request via the network endpoint. The network endpoint is a pre-provisioned network endpoint. Moreover, the method includes sending the request for execution to the network endpoint, the request comprising execution instructions corresponding to accessing the application at the network endpoint. Additionally, the method includes collecting a response received from the network endpoint from accessing the application. Furthermore, the method includes sending the response to the client application.

In one or more embodiments, the geo-location specific data is provided by the application or by measuring geo-specific application performance using different protocols. In one or more embodiments, the request includes an application programming interface (API) key, a protocol for executing the request, and an endpoint to execute the request. In one or more embodiments, the virtual circuit includes a virtual circuit ID having information of the client, an endpoint destination, a parameter for controlling routing of an operation, and the request, wherein the virtual circuit ID is a unique identifier. In one or more embodiments, the virtual circuit ID is a unique identifier generated based at least in part on at least one of the request, the route selected, or the network endpoint.

In one or more embodiments, the network endpoint is a remote self-contained system having computational power, storage, network elements and a locally available network configured for routing and implementing the execution instructions for accessing the application from the particular geographical location of the network endpoint. In one or more embodiments, the locally available network in the network endpoint is a mobile network. In one or more embodiments, the locally available network in the network endpoint is a consumer grade network. In one or more embodiments, the response is received from execution of the request at the network endpoint for accessing the application, wherein the response is sent to the client.

In one or more embodiments, the method also includes processing another request to execute the application at the network endpoint to mimic a user device accessing the application from the geographical location via the network endpoint that is established, receiving, in response to an execution of the another request at the application, geo-location specific data from the network endpoint corresponding to another access of the application, and returning additional geo-location specific data to the client application.

In another embodiment, a computer system for accessing an application from a different location than a location of a client application includes receiving a request from the client application to access an application via a particular geographical location to collect geo-location specific data via a network endpoint located in the particular geographical location includes a computer processor to execute a set of program code instructions and a memory to hold the program code instructions, in which the program code instructions includes program code to perform a process, the process includes receiving a request from the client application to access an application via a particular geographical location to collect geo-location specific data via a network endpoint located in the particular geographical location. The process also includes selecting a route to send traffic via the particular geographical location using the network endpoint. The process further includes establishing a virtual circuit to route the request via the network endpoint. The network endpoint is a pre-provisioned network endpoint. Moreover, the process includes sending the request for execution to the network endpoint, the request comprising execution instructions corresponding to accessing the application at the network endpoint. Additionally, the process includes collecting a response received from the network endpoint from accessing the application. Furthermore, the process includes sending the response to the client application.

In one or more embodiments, the geo-location specific data is provided by the application or by measuring geo-specific application performance using different protocols. In one or more embodiments, the request includes an application programming interface (API) key, a protocol for executing the request, and an endpoint to execute the request. In one or more embodiments, the virtual circuit includes a virtual circuit ID having information of the client, an endpoint destination, a parameter for controlling routing of an operation, and the request, wherein the virtual circuit ID is a unique identifier. In one or more embodiments, the virtual circuit ID is a unique identifier generated based at least in part on at least one of the request, the route selected, or the network endpoint.

In one or more embodiments, the network endpoint is a remote self-contained system having computational power, storage, network elements and a locally available network configured for routing and implementing the execution instructions for accessing the application from the particular geographical location of the network endpoint. In one or more embodiments, the locally available network in the network endpoint is a mobile network. In one or more embodiments, the locally available network in the network endpoint is a consumer grade network. In one or more embodiments, the response is received from execution of the request at the network endpoint for accessing the application, wherein the response is sent to the client.

In one or more embodiments, the process also includes processing another request to execute the application at the network endpoint to mimic a user device accessing the application from the geographical location via the network endpoint that is established, receiving, in response to an execution of the another request at the application, geo-location specific data from the network endpoint corresponding to another access of the application, and returning additional geo-location specific data to the client application.

In another embodiment, a computer readable medium having stored thereon a sequence of instructions which, when executed by a processor causes the processor to execute a method for accessing an application from a different location than a location of a client application includes receiving a request from the client application to access an application via a particular geographical location to collect geo-location specific data via a network endpoint located in the particular geographical location, the method includes receiving a request from the client application to access an application via a particular geographical location to collect geo-location specific data via a network endpoint located in the particular geographical location. The method also includes selecting a route to send traffic via the particular geographical location using the network endpoint. The method further includes establishing a virtual circuit to route the request via the network endpoint. The network endpoint is a pre-provisioned network endpoint. Moreover, the method includes sending the request for execution to the network endpoint, the request comprising execution instructions corresponding to accessing the application at the network endpoint. Additionally, the method includes collecting a response received from the network endpoint from accessing the application. Furthermore, the method includes sending the response to the client application.

In one or more embodiments, the geo-location specific data is provided by the application or by measuring geo-specific application performance using different protocols. In one or more embodiments, the request includes an application programming interface (API) key, a protocol for executing the request, and an endpoint to execute the request. In one or more embodiments, the virtual circuit includes a virtual circuit ID having information of the client, an endpoint destination, a parameter for controlling routing of an operation, and the request, wherein the virtual circuit ID is a unique identifier. In one or more embodiments, the virtual circuit ID is a unique identifier generated based at least in part on at least one of the request, the route selected, or the network endpoint.

In one or more embodiments, the network endpoint is a remote self-contained system having computational power, storage, network elements and a locally available network configured for routing and implementing the execution instructions for accessing the application from the particular geographical location of the network endpoint. In one or more embodiments, the locally available network in the network endpoint is a mobile network. In one or more embodiments, the locally available network in the network endpoint is a consumer grade network. In one or more embodiments, the response is received from execution of the request at the network endpoint for accessing the application, wherein the response is sent to the client.

In one or more embodiments, the method also includes processing another request to execute the application at the network endpoint to mimic a user device accessing the application from the geographical location via the network endpoint that is established, receiving, in response to an execution of the another request at the application, geo-location specific data from the network endpoint corresponding to another access of the application, and returning additional geo-location specific data to the client application.

In another embodiment, a method includes receiving a request to route an execution of an operation to be performed on an application from a specific geographic location. The method also includes identifying a route to send the request for execution of the operation at an endpoint based at least in part on parameters received from the request, the parameters comprising a geographic location to execute the request, a protocol to execute the request, and a destination application to execute the operation. The method further includes determining whether sub-systems and remote endpoints have capacity or capability to execute the request at the endpoint. Moreover, the method includes upon determining capacity or capability is not available, identifying an alternate path and alternate endpoint for executing the request. Additionally, the method includes upon determining the sub-systems and remote endpoints have capacity or capability, generating a unique identifier for the request to be used as a software defined networking construct for routing and managing respective requests without having knowledge about underlying hardware and networks.

In one or more embodiments, the unique identifier is used to associate a response comprising geo-location specific data received from the endpoint, the response corresponding to the execution of the operation performed by the endpoint on the destination application. In one or more embodiments, subsequent requests comprising the unique identifier are received from the client for simulating an interactive session with the destination Application via the endpoint associated to the unique identifier. In one or more embodiments, the unique identifier is recycled based at least in part on a termination request received by a user or an expiration of a predefined time-to-live.

In another embodiment, a computer system includes a computer processor to execute a set of program code instructions and a memory to hold the program code instructions, in which the program code instructions includes program code to perform a process, the process includes receiving a request to route an execution of an operation to be performed on an application from a specific geographic location. The process also includes identifying a route to send the request for execution of the operation at an endpoint based at least in part on parameters received from the request, the parameters comprising a geographic location to execute the request, a protocol to execute the request, and a destination application to execute the operation. The process further includes determining whether sub-systems and remote endpoints have capacity or capability to execute the request at the endpoint. Moreover, the process includes upon determining capacity or capability is not available, identifying an alternate path and alternate endpoint for executing the request. Additionally, the process includes upon determining the sub-systems and remote endpoints have capacity or capability, generating a unique identifier for the request to be used as a software defined networking construct for routing and managing respective requests without having knowledge about underlying hardware and networks.

In one or more embodiments, the unique identifier is used to associate a response comprising geo-location specific data received from the endpoint, the response corresponding to the execution of the operation performed by the endpoint on the destination application. In one or more embodiments, subsequent requests comprising the unique identifier are received from the client for simulating an interactive session with the destination Application via the endpoint associated to the unique identifier. In one or more embodiments, the unique identifier is recycled based at least in part on a termination request received by a user or an expiration of a predefined time-to-live.

In another embodiment, a computer readable medium having stored thereon a sequence of instructions which, when executed by a processor causes the processor to execute a method, the method includes receiving a request to route an execution of an operation to be performed on an application from a specific geographic location. The method also includes identifying a route to send the request for execution of the operation at an endpoint based at least in part on parameters received from the request, the parameters comprising a geographic location to execute the request, a protocol to execute the request, and a destination application to execute the operation. The method further includes determining whether sub-systems and remote endpoints have capacity or capability to execute the request at the endpoint. Moreover, the method includes upon determining capacity or capability is not available, identifying an alternate path and alternate endpoint for executing the request. Additionally, the method includes upon determining the sub-systems and remote endpoints have capacity or capability, generating a unique identifier for the request to be used as a software defined networking construct for routing and managing respective requests without having knowledge about underlying hardware and networks.

In one or more embodiments, the unique identifier is used to associate a response comprising geo-location specific data received from the endpoint, the response corresponding to the execution of the operation performed by the endpoint on the destination application. In one or more embodiments, subsequent requests comprising the unique identifier are received from the client for simulating an interactive session with the destination Application via the endpoint associated to the unique identifier. In one or more embodiments, the unique identifier is recycled based at least in part on a termination request received by a user or an expiration of a predefined time-to-live.

In another embodiment, a method includes analyzing a response for blocks or captcha elements within a response body of the response as a result of an operation performed on an application. The method also includes upon determining the response comprise blocks or captcha elements, generating a corrective action to execute the operation on the application without getting blocked or served a captcha response. The method further includes resending a client request with the corrective action to an endpoint for executing the client request using the corrective action on the application.

In one or more embodiments, the response is received as a result of an execution of an operation performed on an application by an endpoint from a particular geographical location. In one or more embodiments, the corrective action comprises a new network path to resend a client request for execution on the application. In one or more embodiments, only a finite number of retries corresponding to the resending of the client request is based at least in part on a protocol used at the endpoint. In one or more embodiments, the corrective action comprises a different set of end-user emulation instructions for a HTTP request to the application. In one or more embodiments, the different set of end-user emulation instructions comprise at least one of headers, a cookie, a device fingerprint, or a mouse movement.

In another embodiment, a computer system includes a computer processor to execute a set of program code instructions and a memory to hold the program code instructions, in which the program code instructions include program code to perform a process, the process includes analyzing a response for blocks or captcha elements within a response body of the response as a result of an operation performed on an application. The process also includes upon determining the response comprise blocks or captcha elements, generating a corrective action to execute the operation on the application without getting blocked or served a captcha response. The process further includes resending a client request with the corrective action to an endpoint for executing the client request using the corrective action on the application.

In one or more embodiments, the response is received as a result of an execution of an operation performed on an application by an endpoint from a particular geographical location. In one or more embodiments, the corrective action comprises a new network path to resend a client request for execution on the application. In one or more embodiments, only a finite number of retries corresponding to the resending of the client request is based at least in part on a protocol used at the endpoint. In one or more embodiments, the corrective action comprises a different set of end-user emulation instructions for a HTTP request to the application. In one or more embodiments, the different set of end-user emulation instructions comprise at least one of headers, a cookie, a device fingerprint, or a mouse movement.

In another embodiment, a computer readable medium having stored thereon a sequence of instructions which, when executed by a processor causes the processor to execute a method, the method includes analyzing a response for blocks or captcha elements within a response body of the response as a result of an operation performed on an application. The method also includes upon determining the response comprise blocks or captcha elements, generating a corrective action to execute the operation on the application without getting blocked or served a captcha response. The method further includes resending a client request with the corrective action to an endpoint for executing the client request using the corrective action on the application.

In one or more embodiments, the response is received as a result of an execution of an operation performed on an application by an endpoint from a particular geographical location. In one or more embodiments, the corrective action comprises a new network path to resend a client request for execution on the application. In one or more embodiments, only a finite number of retries corresponding to the resending of the client request is based at least in part on a protocol used at the endpoint. In one or more embodiments, the corrective action comprises a different set of end-user emulation instructions for a HTTP request to the application. In one or more embodiments, the different set of end-user emulation instructions comprise at least one of headers, a cookie, a device fingerprint, or a mouse movement.

Each of the individual embodiments described and illustrated herein has discrete components and features that may be readily separated from or combined with the components and features of any of the other several embodiments.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. In order to better appreciate the advantages and objects of embodiments of the disclosure, reference should be made to the accompanying drawings. However, the drawings depict only certain embodiments of the disclosure, and should not be taken as limiting the scope of the disclosure.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings).

FIG. 3C illustrates a flowchart of an authentication and authorization model implemented within the cloud routing platform, according to some embodiments of the disclosure.

FIGS. 6A-6E are example graphical user interfaces of customer facing dashboards for managing access and usage of the Platform, according to some embodiments of the disclosure.

DETAILED DESCRIPTION

Figure 1A:
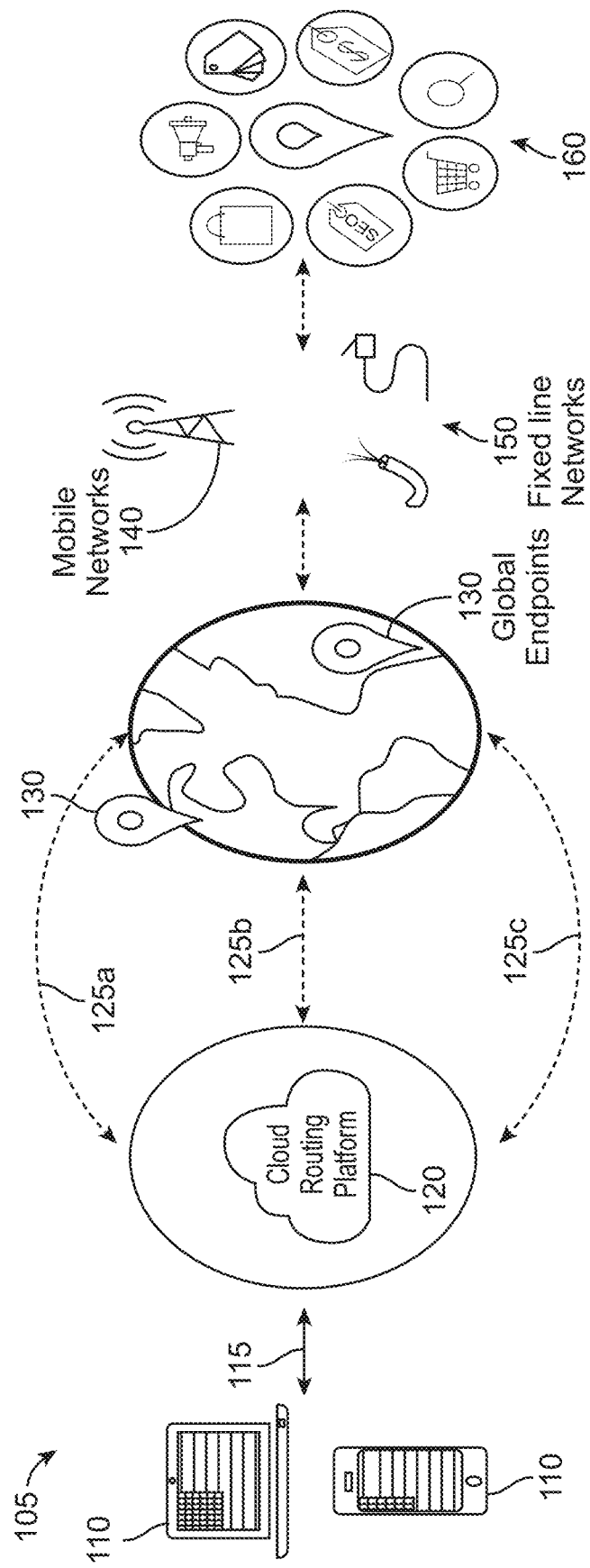
FIG. 1A illustrates a high-level architecture and flow in which some embodiments of the disclosure are implemented.

The present disclosure provides an improved approach for a network presence platform with intelligent routing.

Various embodiments are described hereinafter with reference to the figures. It should be noted that the figures are not necessarily drawn to scale. It should also be noted that the figures are only intended to facilitate the description of the embodiments, and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, references, throughout this specification, to "some embodiments" or "other embodiments" suggests that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Due to the rise of applications requiring geo-location specific data, current legacy solutions do not offer a network presence platform for providing application developers (e.g., software applications, commercial applications, mobile applications, websites, etc.) an ability to quickly test their software at geographically specific locations (e.g., at a different location than where the developer is physically located) to fully understand how their applications perform at the specific geo-location.

Embodiments of the disclosure address these problems by providing an API, an infrastructure and specific routing modules for allowing application developers the ability to quickly identify which geo-location specific endpoints needs to be established and how traffic needs to be routed to the specific endpoints to gather the geo-location specific data pertaining to their applications.

The API and its accompanying microservices may be deployed on a public cloud platform. Together they make up a powerful cloud-based routing platform which send traffic to the different pre-provisioned network endpoints. The endpoints are geographically distributed and generally comprise of a combination of physical or virtual servers, networking elements like switches and routers with different types of network connections (e.g., datacenter networks, consumer grade broadband connections and cellular networks) engineered together for use. In addition to the pre-provisioned network endpoints which may be implemented in shared environments, users can choose to extend network presence coverage available to them by including their enterprise or private networks. This may include deploying endpoint software on dedicated servers with pre-scribed specifications within these networks. Alternatively, placing special smaller hardware devices (with pre-deployed endpoint software) within these networks can provide low scale but fully functional network endpoint for easy deployment across locations. In some embodiments, the smaller hardware devices may include custom hardware devices discussed further below in this disclosure.

Figure 1B:
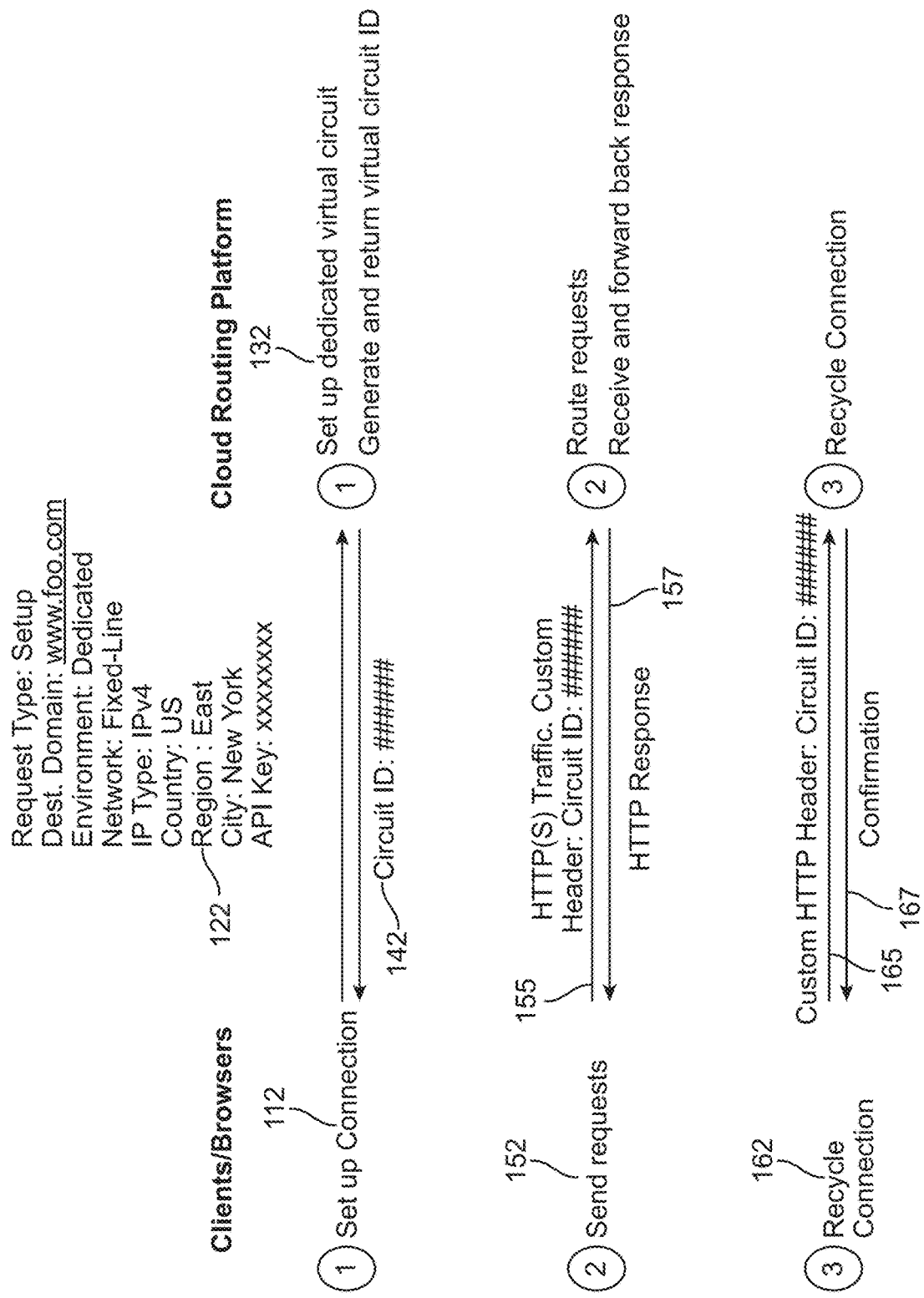
FIG. 1B illustrates an example of virtual circuits, according to some embodiments of the disclosure.
Figure 1C:
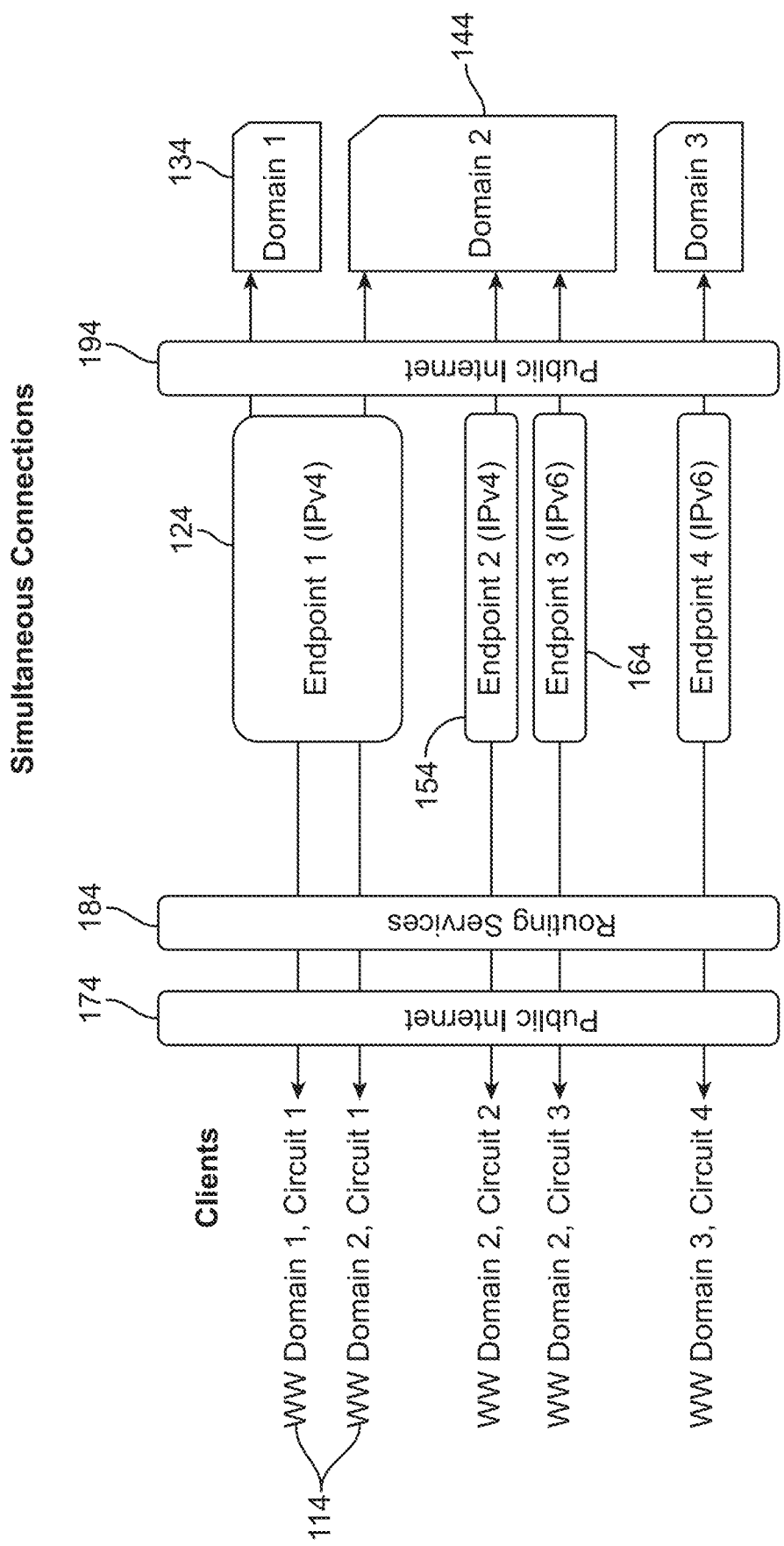
FIG. 1C illustrates an example of simultaneous connections of virtual circuits, according to some embodiments of the disclosure.

FIG. 1A-1C illustrates a high-level architecture and flow diagram in which some embodiments of the disclosure are implemented. Please note, with respect to FIG. 1A, dotted connector lines with arrows illustrate a flow of data across the different components within the Platform, whereas solid connector lines with arrows illustrate the interactions of a user with the Platform. The solid connector lines represent a user request sent by calling the API within a computer program or application and receiving the corresponding response from the Platform, according to some embodiments of the disclosure.

For illustrative purposes, FIG. 1A illustrates a high-level architecture and flow in which some embodiments of the disclosure are implemented. The architecture 105 shows a network presence platform with intelligent routing. The architecture 105 includes a client 110 that may be any computer program or application (hereinafter referred to as "Clients") that runs on a computing device that accesses the Platform via an API 115. A computing device may encompass any type of device, such as, for example, a computer or a mobile device capable of running a program or computer application. The Platform may include a cloud routing platform 120, global endpoints 130, mobile networks 140 and/or fixed line networks 150 configured for use with global endpoints, and online applications like websites, hereinafter referred to as "Applications" 160 that may be accessed via the endpoints 130.

A Client 110 may send requests and receive responses from the Platform over the API layer 115. Users may sign up for an account to receive a set of API keys and credentials before using the API 115 within the Clients. A set of API keys and credentials are generated and stored in a federated identity store (not shown).

Users may use the API keys to directly interact with the Platform via API 115. To call the API within Client program or application, users may use an SDK in one of the many programming languages to interact with the API 115 using their API keys. Additionally, non-technical users may use a browser toolbar (e.g., browser extension) which is an out of box Client that internally uses the API 115. For example, the browser toolbar may be a browser plugin that may be downloaded and installed on a browser of a user device. This browser toolbar provides a graphical way for users to specify the traffic they want to send (e.g., destination, protocol, request description and parameters etc.) along with the endpoint(s) and its respective networks that a typical end-user may want to use. An end-user is a physical person who would normally access and/or interact with an Application 160. As discussed herein, a user may be a developer or a user of the Platform who would like to, as an example, test a website's performance using the Platform by sending requests to the Platform to perform an operation as if an end-user was physically performing the operation by having the Platform perform the operation in place of the end-user. This way, the user/developer may utilize the Platform to mimic end-user activities performed on an Application 160 from a particular geographic location so that the user/developer may receive geo-location specific data for the website the user is testing. Clients are the means to send and receive data from the routing platform. Note that the communication is software defined versus a layer 2 network level solution used in legacy solutions. L2 is the TCP/IP network layer used to transfer data between adjacent network nodes in a wide area network or between nodes on the same local area network.

Virtual circuits 125a-125c are software defined networking constructs that allow the different components of the Platform (e.g., client-side software, client application, cloud hosted API, routing platform, and endpoints) to work together to perform an operation on behalf of the user. For example, an operation may be gathering load time of a website from a specific endpoint using a specific type of network like DSL lines. Additionally, virtual circuits 125a-125c provide developers control over routing functions while being abstracted from the lower layers and details of the hardware and network setup of the different types of endpoints.

Virtual circuits may be analogized or explained in the context of the legacy system of postal mail service. For example, the snail mail system (e.g., the simple postal service delivering mail) may be used for comparison to a virtual circuit for explanatory purposes. In this example, assume that when someone sends someone else a letter, the recipient may respond back with another letter. In the traditional snail mail system, a letter is placed in an envelope, a destination address is provided, a return address is provided and the letter is placed in a letter box or post box for delivery. After placing the letter into the letter box, the sender has no control over how the letter will reach the destination and receiver. The only guarantee is that existing transit networks will be used by the mailing/postal system, along with processes already in place to deliver the mail to its proper destination. No guarantees are made, however, as to how and which paths the mail will be sent. Furthermore, the receiver of the message may respond to the message/letter using the same mailing system. Neither the sender nor receiver has any control over the path through which their letters are routed and there is no tracking mechanism. Once the letter reaches the endpoint (e.g., the final post office) a postman delivers the letter to the destination—letterbox of the receiver (e.g., as compared to the endpoints of the present disclosure). The snail mail approach is now compared to typical traffic sent over an internet connection. When a user types a request to access a website on their Internet browser, the networking layer takes care of routing the request to the destination world-wide web WWW address and routing a response back to the user. Unlike snail mail, there is acknowledgement sent to the sender and receiver about the delivery of the messages or failures. However, the major point to note is that the user has no control over how the traffic is routed to the destination over the Internet.

Now consider sending a mail and getting a response back using the priority mailing system with postal tracking. By virtue of using the priority mailing system and choosing the different options it offers, a sender may be optimizing the flow of the letter over the shortest path, using the fastest transit (e.g., air delivery) and the letter is tracked along the way. A unique identifier generated for a letter dictates how the letter will flow and be treated across the different mailing systems and processes for the letter to be delivered quickly, reliably and tracked at every step of the way. This leads to the fastest possible delivery to the endpoint—final post office. From the final post office, the letter, like any other mail, is delivered by a postman to the destination—the letter box of the receiver. The process is repeated when the receiver sends a priority mail back to the original sender.

Virtual circuits operate in a similar way where a unique virtual circuit ID is similar to the tracking number provided in the priority mail example. The virtual circuit is created based on the request parameters sent by the Client application—just like the options selected while sending a priority mail. The virtual circuit ID typically contains information about the sender+endpoint destination+different parameters for controlling routing of request+request. The virtual circuit ID and associated parameters dictate how the request will flow and be handled/managed across the different systems and processes of the present disclosure before being finally sent out to the Internet using an endpoint network to the destination Application. The response, when received from the destination Application, is stamped with the same virtual circuit information to be routed and tracked back to the Client application.

With an understanding of virtual circuits, following are some real-world examples of how the virtual circuits work and how the components of the present disclosure (e.g., the Platform) work together.

The endpoints 130 are geographically distributed and generally comprise of physical and/or virtual servers with different types of network connections, such as for example, datacenter networks, consumer grade broadband connections such as fixed line networks 150 and/or mobile cellular networks 140, just to name a few. Endpoints 130 are designed to be stateless routers which support routing traffic of different protocols. Endpoints 130 may be categorized using the type of network (e.g., last mile, datacenter, cloud) that are used in building the endpoints 130. Endpoints are further disclosed below. In some embodiments, a network endpoint is a remote self-contained system having computational power, storage, network elements and a locally available network configured for routing and implementing the execution instructions for accessing the application from the particular geographical location of the network endpoint. The endpoint 130 may be located in a different location than a client that issues a request to access/interact with the Application 160.

Application(s) 160 refer to any online application that may be made accessible via one or more standard internet protocols. For example, a destination Application 160 may be a search engine specifically designed for searching movies shown at movie theatres within a geo-location specific area. As another example Application 160 may be an online retail site selling surfing equipment that may be interested in selling surfing related equipment to consumers located on the coastal cities where people may surf. Because users/developers are building Applications that may present geo-location specific data, embodiments of the present disclosures provide the infrastructure and means for the users/developers to test their Applications by specifying, via an API, the endpoints to test that the appropriate content of the Applications will be displayed to end-users. The user may also be able to specify the type of networks (e.g., Mobile and/or fixed line networks) on which to send their requests for accessing and/or interacting with the Applications. In some embodiments, the geo-location specific data is provided by the Application or by measuring geo-specific application performance using different protocols performed on the Application from specific geographical locations.

FIG. 1B illustrates an example of virtual circuits, according to some embodiments of the present disclosure. As disclosed above, a virtual circuit may be a software defined networking construct that allow the different components and/or modules of the Platform (e.g., client-side software, cloud hosted API, routing platforms, and endpoints) to work together to perform an operation on behalf of the user. The operation may include an access to and/or interaction with an Application from a particular geographical location. Additionally, the virtual circuit may provide a user/developer control over routing functions while being abstracted from the lower layers and details of the hardware and network setup of the different endpoints.

A virtual circuit is created for the first time when a user wants to set up a connection (e.g., Set up Connection 112) by invoking the API and requesting for traffic to be routed. FIG. 1B shows this request, as an example, for an HTTP(s) request that a user is sending to be routed to an endpoint. The Client, using SDKs or browser extensions, may call the API and submit a list of parameters 122 associated with the request. The routing platform may create a virtual circuit ID (e.g., Setup dedicated circuit generate and return virtual circuit ID 132) for this request based on the parameters 122 which are essentially a promise to execute the request by allocating resources such as network bandwidth, IP addresses and network types to fulfill the request. The unique identifier (e.g., circuit ID 142) associated with the virtual circuit is sent back to the Client. The Client can use the unique identifier (e.g., circuit ID 142) that is associated to a particular virtual circuit to send one or more requests 152 over the virtual circuit so that the Platform may execute the request 152 using the endpoint, network and IP addresses configured at Setup.

Additional requests 152 from Clients may be sent to the routing platform (via 155) using an existing virtual circuit. The request 152 may include, as an example, in a HTTP(s) header, a custom header value having the unique identifier (e.g., circuit ID 142) to identify the virtual circuit to be used by the routing platform to process the request 152. Although not shown in FIG. 1B, the request 152 may be routed via a particular endpoint and a specific network within an endpoint (e.g., an HTTPS request to destination domain of www.foo.com routed via a specific DSL line within an existing endpoint in New York). The response from an Application received at the endpoint may be routed back (e.g., via 157) to the Client that sent the request 152. Once done with virtual circuit, the Client can explicitly recycle the virtual circuit(s) 162 or let the Platform recycle this after a certain expiration time. For example, the Client may issue a request (e.g., at 165) to a recycling service to recycle the virtual circuit as identified in the HTTP Header. Confirmation that the virtual circuit is recycled may be sent back to the Client (e.g., via 167).

FIG. 1C illustrates an example of multiple virtual circuit setups in the multitenant Platform, according to some embodiments of the disclosure. Virtual circuits allow multiple Clients to use the geographically spread endpoints without contention. As shown in FIG. 1C, virtual circuits allow Clients to have control over how their traffic is routed. This is shown for an HTTP(s) protocol. Note that circuit 1 (e.g., 124) shows an example customer request that has two destination URLs 114 defined to route traffic to two different Applications (e.g., internet domain 134 and internet domain 144). Similarly, traffic to internet domain 144 is routed via different circuits with IPv4 (e.g., 154) and IPv6 IP (e.g., 164). As shown in the figure, Clients connect to the cloud routing platform over the public internet 174. Routing services 184 create the necessary virtual circuits which are then used by Clients for communicating with the routing platform. Cloud routing platform 184 then sends the requests to endpoints. Endpoints then use public internet 194 to access Applications using the instructions provided in the Client request.

Figure 2:
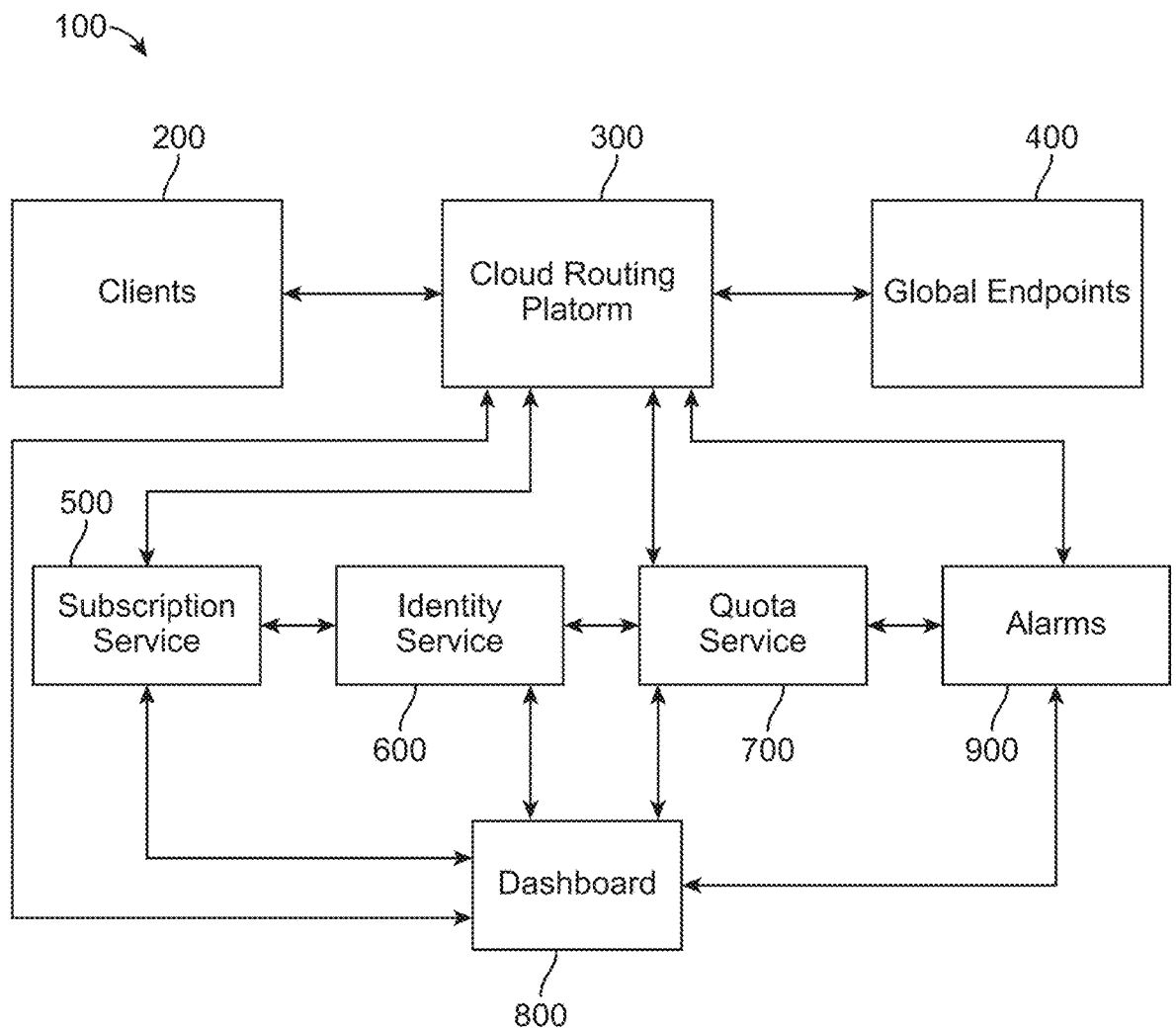
FIG. 2 illustrates an entity diagram for distributed systems working together to implement a scalable network presence platform.

FIG. 2 illustrates an entity diagram for distributed systems working together to implement a scalable network presence platform, according to some embodiments of the disclosure. The scalable network presence platform 100 includes Clients 200, cloud routing platform 300 and endpoints 400.

Clients 200 are customer programs and applications accessing the Platform via API. Cloud routing platform 300 is a collection of computer-implemented modules for routing requests received from the Clients 200. Cloud routing platform 300 may be considered the "brain" of the Platform that is responsible for securely routing traffic from the Clients 200 to endpoints 400 and vice-versa. In implementing the routing requests, cloud routing platform 300 communicates with endpoints 400 to set up virtual circuits to route traffic from the Clients 200 to the endpoints 400 for accessing any Applications 160. Additionally, cloud routing platform 300 may also communicate with other modules to fulfill the requests from Clients 200. The other modules may include a subscription service 500, an identity service 600, a quota service 700, alarms 900, and a dashboard 800 for displaying, to a user, results of the executed Client requests.

Subscription service 500 is a module that provides user/developer sign-up functionality and account management features. The subscription service 500 may include a sign-up component, a plans module, a subscription service datastore, and a billings module. The sign-up component may be a self-service signup component for onboarding new users. The plans module may provide various subscription plans available to users during sign up. Available plans may be based on number of requests clients can send, coverage and type of endpoints clients can send requests to or any similar measurable parameter. The users' metadata along with the associated plans are stored in a subscription service datastore and the information is used for billing and viewing by the cloud platform routing services 300. User credentials may be stored in a SOX compliant federated identify store.

Identity service 600 is a module that manages a user's identity for accessing the Platform. For example, when a user signs up for the Platform via Subscription service 500, a set of API keys and credentials are generated and stored in a federated identity store. The identity service 600 manages the user's identity for the Platform so that other modules and services within the Platform may access the identity services 600 at any point during servicing a user's request to confirm the user's identity as well as the identity of the traffic being routed or the services being performed.

Quota service 700 is a module that plays a pivotal role in the setup of virtual circuits 125a, 125b, and 125c by the cloud routing platform 300. In some embodiments, quota service 700 may query information from health monitoring service 370 to obtain an inventory of endpoints that are available for sending Client requests. Quota service 700 may compute an overall capacity plan based on the queried data about the operations that can be performed by the Platform. When called by a Throttler service 336, the quota service 700 may compute the viability of processing a given request by a given Client. Quota service 700 may validate Client requests using identity service 600, retrieve any custom rules 303 that are applicable for the Client request and then check if there is an endpoint with available capacity and/or capability (e.g., protocol support) available to execute the Client request. Information about the endpoint is then provided to Virtual Circuit Manager 350 of the cloud routing platform to create a virtual circuit. Some results from invocation of Quota Service 700 are cached for faster processing of enquiries from the Throttler service 336, which improves the speed of processing a transaction.

Alarms 900 is a module that sends out alerts and alarms for error processing or notifications to users and/or administrators of the Platform. If an error occurs during a processing of a user request by a module or a step of the present disclosure, the alarms 900 module would send out the corresponding alerts and/or alarms.

Dashboard 800 may be implemented as a graphical user interface that allows users to use the Dashboard for managing their usage and access to the platform. Additionally, users can use the dashboard for looking at results and performance metrics of executed Client requests, managing billing or any alarms and notifications generated by the platform. For example, users interact with the dashboard 800 when they sign up for a subscription. Users may use the dashboard 800 for defining custom rules that will be used by the Platform via a custom rules engine 303 (disclosed below) to filter any requests. For example, the Platform filters traffic destined for blacklisted destinations (e.g., obscene websites, illegal proxy servers, etc.) and sends a rejection to the client. Similarly, users may use the dashboard 800 for defining custom rules that will be used by the Platform to filter any requests made by the users, above and beyond the filters provided by the Platform. Then on an ongoing basis, users of the Platform can use the Dashboard to monitor the Client requests they send along with the results.

Figure 3A:
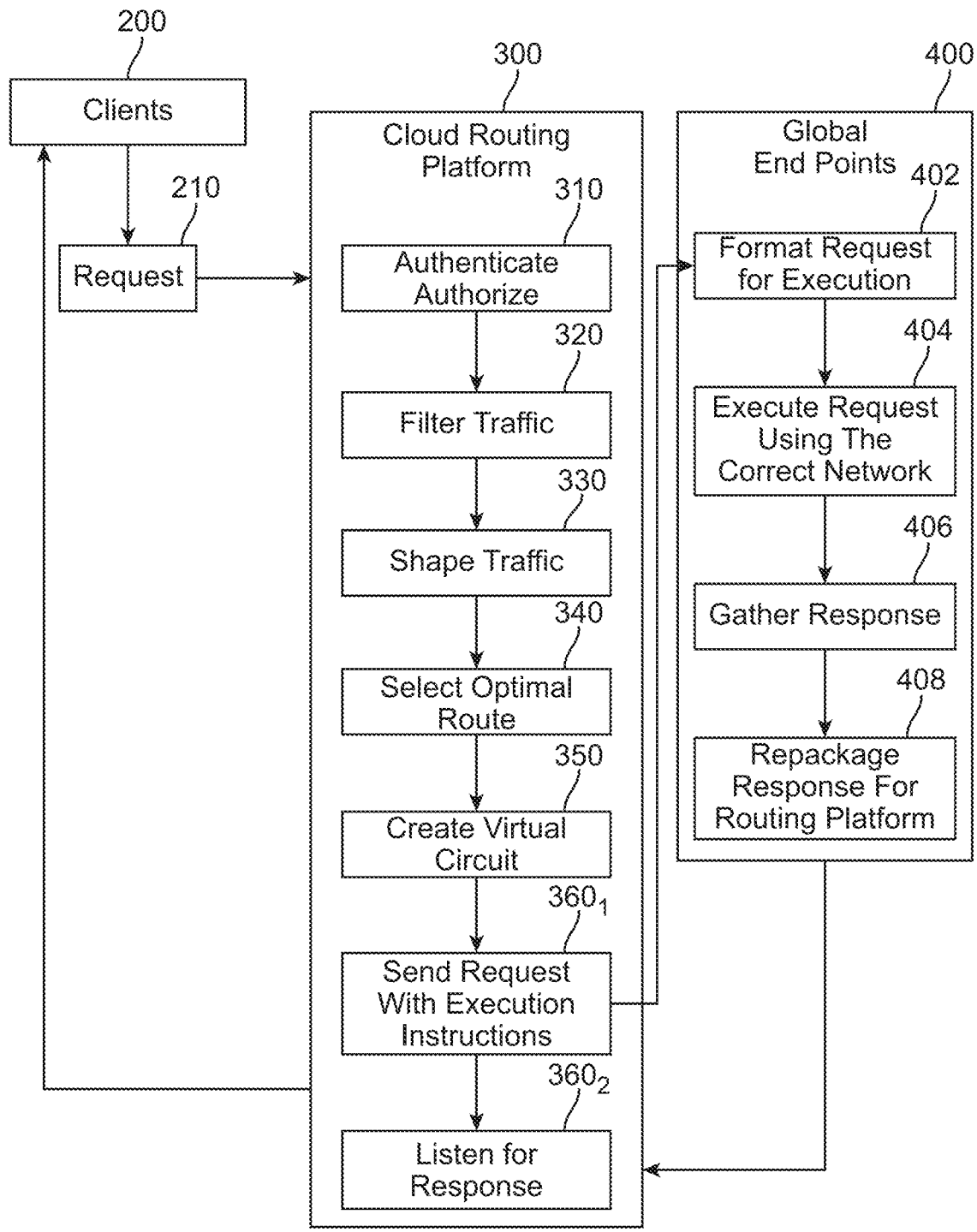
FIG. 3A illustrates a flowchart to process requests from clients through the various systems and sub-systems of the routing platform according to some embodiments of the disclosure.

FIGS. 3A-3L illustrate various processing modules and/or flowcharts pertaining to the routing platform 300. FIG. 3A illustrates a flowchart to process requests from Clients through the various systems and sub-systems of the routing platform, according to some embodiments of the disclosure. Client 200 may send request(s) 210 with execution parameters (e.g., API Key, ClientID, protocol, endpoints to be used and other information) via the API to the cloud routing platform 300.

The cloud routing platform 300 may authenticate and authorize the request 210 at step 310 before further processing. The request 210 may then go through a traffic filter at step 320 to stop any traffic that may use blacklisted protocols, ports (e.g. a user defined rule to prevent SMTP traffic to a given site at port 25) or specific destination Applications (e.g. obscene websites or dark web). Once the request 210 is successfully filtered, the request may go through a traffic shaper at step 330 to make sure the client has not exceeded any traffic threshold recently (to be discussed further below). Next, an optimal route may be selected (e.g., by a path selector at step 340) based on the information provided in the request 210 (e.g., city and country where the endpoints should be used) or intelligently (automatic selection) by the Platform when the information is absent.

A virtual circuit may then be created (by a virtual circuit manager at step 350) to include a unique identifier generated by a combination of "requester+request+selected path+endpoint destination". The created virtual circuit may then be sent (by Request/Response Handler at step 360 or Send Request with Execution Instructions at step $361_1$) along with the request 210 to subsequent subsystems (e.g., endpoints 400) for execution.

At the endpoint 400, the request 210 may be reformatted/transformed (at step 402) for execution (at step 404). The results are collected (at step 406) and sent back/responded to the routing platform at step 408. For example, the request 210 may have parameters defining a geographical location the client would like to execute an operation, the operation protocol that may be used by an endpoint to execute an operation, and a URL address corresponding to an Application that the Client would like to execute the operation. As the routing platform is setting up the virtual circuit and the endpoint to process the request 210, a virtual circuit ID may be generated based at least in part on the parameters provided by the request. When the endpoint 400 receives the request 210, the request may include the virtual circuit ID that uniquely identifies a particular request as originating from a particular Client and/or user, the destination application URL, and the protocol to use for executing the specified operation. In some embodiments, the protocol may be an HTTP request such that header information for the request may include proprietary information such as the virtual circuit ID to uniquely identify the request and subsequent response results.

The endpoint 400 may include software to transform the request 210 received by the endpoint 400 into an end-user emulation that mimics an end-user performing the specified operation on the Application. In this present embodiment, the HTTP request may need to be modified/transformed such that the proprietary information used to track the request (e.g., Virtual Circuit ID) is removed so that when the HTTP request is sent to the Application to be executed, the Application may not be able to detect the Virtual Circuit ID information in the headers of the HTTP request. The proprietary information is removed/modified because, in some cases, the Application may inspect the HTTP headers during an execution of an operation to ascertain whether the HTTP request is sent by a computer or a human. The routing platform sends the results collected for the request 210 along with the virtual circuit details back to the clients. Upon receiving the results, the clients may choose to send another request using the same virtual circuit. Once completed, the clients may recycle the virtual circuit or allow the system to recycle the virtual circuit after a predefined "time to live" (TTL). Metrics may be gathered as a request is routed through the Platform to provide deep insight into the performance and operations across the systems of the Platform, as depicted by metrics 380 in FIG. 3B. The metrics 380 collected may be viewed by the users via dashboard 800.

Figure 3B:
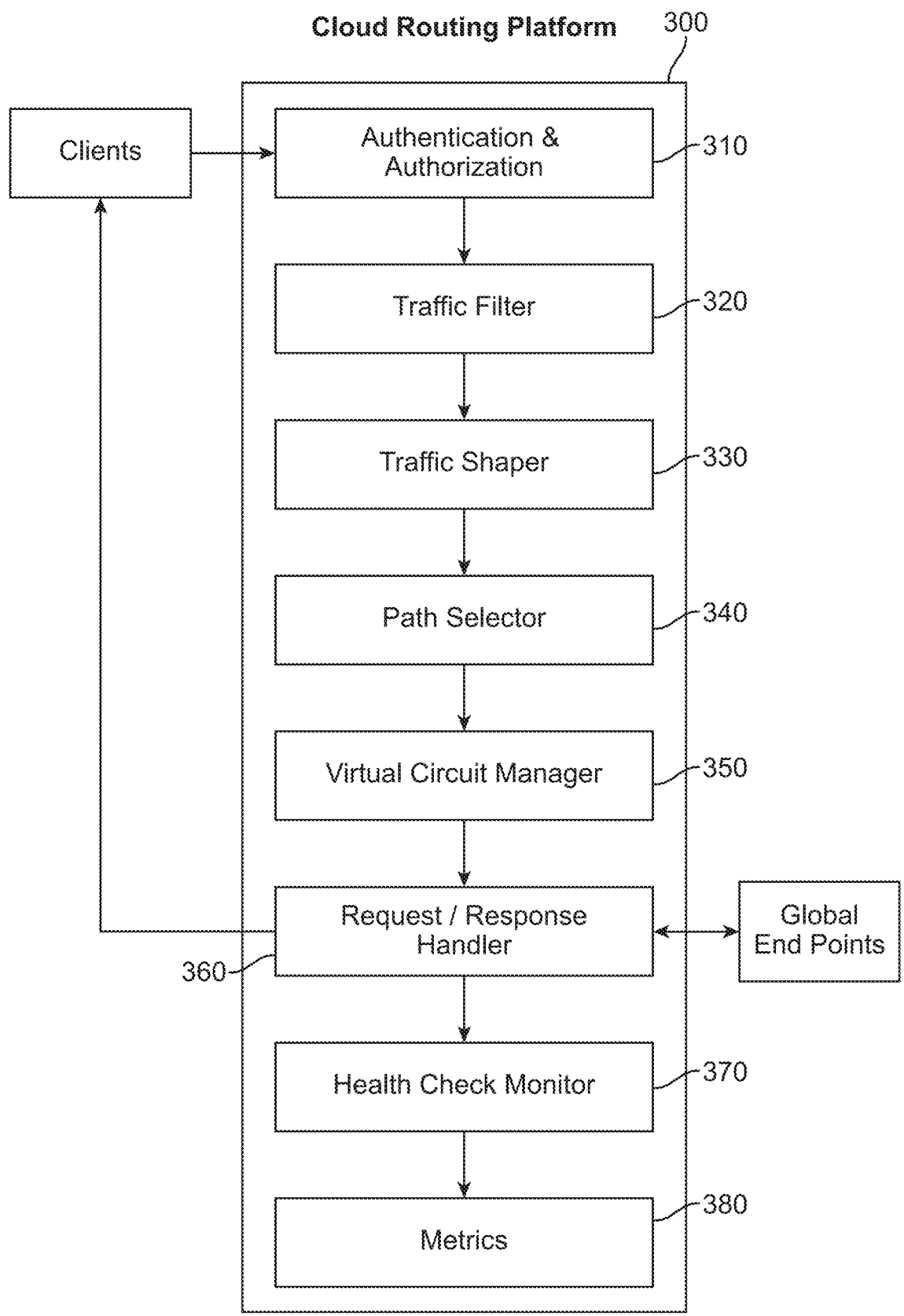
FIG. 3B illustrates a flowchart and modules of a client request navigation within the cloud routing platform, according to some embodiments of the disclosure.

FIG. 3B illustrates a flowchart and modules of a routing platform, according to some embodiments of the disclosure. Routing platform 300 has a collection of microservices/modules that help implement the necessary Internet scale routing service. Routing platform 300 is the brain of the Platform that is responsible for securely routing the traffic from the clients to endpoints and vice-versa. FIG. 3B illustrates the high-level components/modules and the control flow between these components/modules once a request is received from clients 200.

As discussed above in FIG. 3A, the routing platform 300 includes a plurality of components and/or modules for intelligently routing requests to the appropriate endpoints for servicing a client request 210. The routing platform may include an authentication and authorization 310, a traffic filter 320, a traffic shaper 330, a path selector 340, a virtual circuit manager 350, a request/response handler 360, a health check monitor 370, and a metrics 380. Each of these components and/or modules are disclosed in more details in the following FIGS. 3C-3L.

FIG. 3C illustrates a flowchart of an authentication and authorization model, according to some embodiments of the disclosure. Authentication and authorization module 310 may include an authentication module 312 and an authorization module 314. Authentication 312 communicates with federated identify store 600 to validate an API Key and ClientId information provided in a request 210. A rejection is sent to the Client if the validation fails. Authorization module 314 communicates with subscription service 500 to determine whether the client is authorized to send requests. For example, subscription service 500 may determine whether the client has valid a subscription before passing the request to the filter traffic module to determine whether or not the request is a valid request. Based on the type of subscription, the subscription service 500 may determine what kind of resources (e.g., endpoints) the Client 200 has access to and whether the current request may be fulfilled using the access levels associated with the Client 200. A rejection is sent to the Client if authorization fails. Operations may be logged by the metrics service 380. Assuming the request 210 successfully passes through the authentication and authorization module 310, the request 210 may then proceed to the traffic filter 320.

Figure 3D:
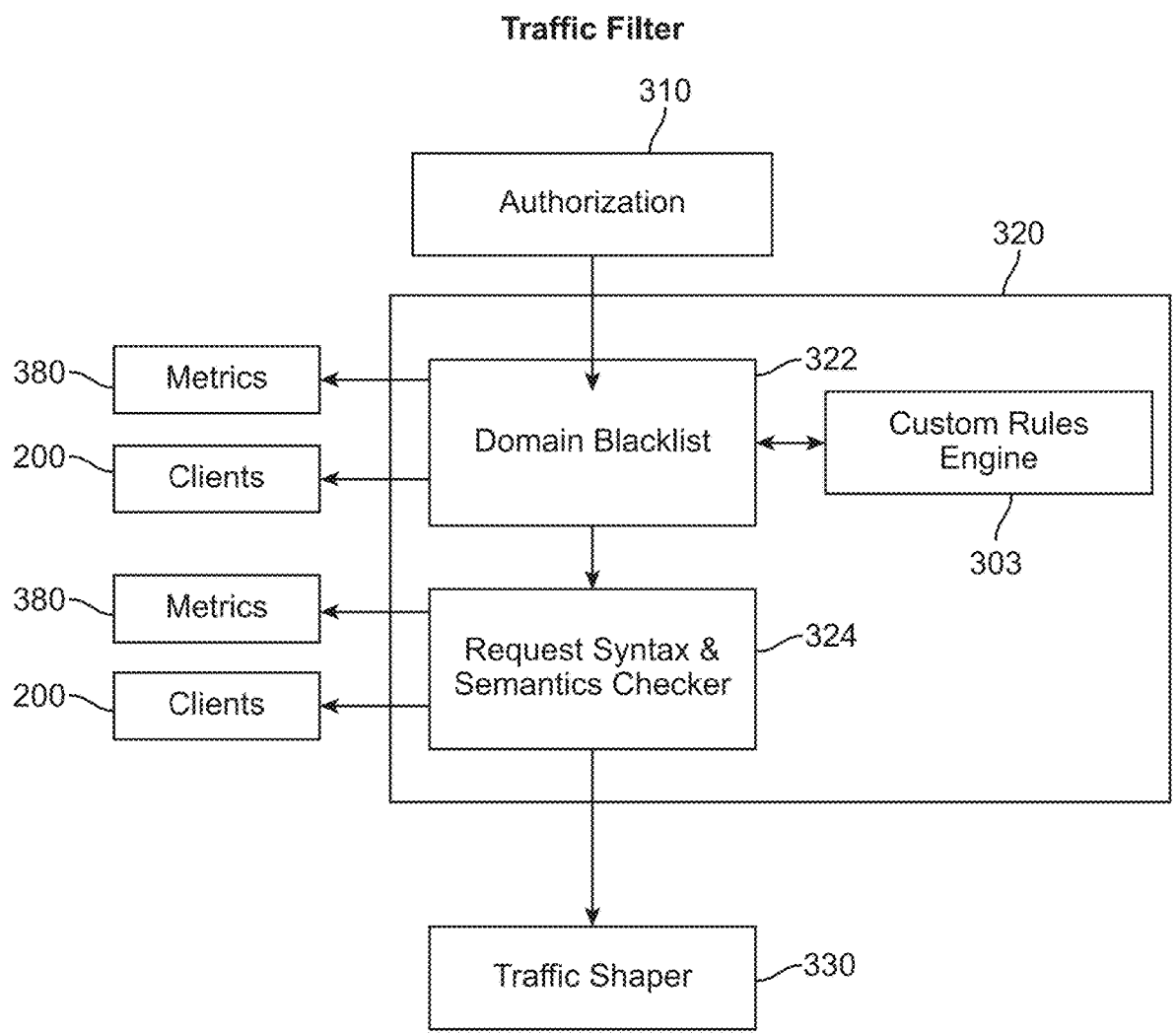
FIG. 3D illustrates a flowchart of a traffic filter, according to some embodiments of the disclosure.

FIG. 3D illustrates a flowchart of a traffic filter, according to some embodiments of the disclosure. The traffic filter 320 may check the request 210 to confirm the traffic involved in the request is appropriate and complies with general and custom defined rules. General defined rules are built into the platform and available to Clients 200 using the Platform. Custom defined rules may be rules specifically defined/created/applicable to particular Clients. Traffic filter module 320 may include a domain blacklist 322, a request syntax and semantics checker 324, and a custom rule engine 303. Domain blacklist 322 filters any traffic destined for blacklisted destinations and sends a rejection to a client if applicable. The Platform maintains a list of objectionable destinations (e.g., destinations known to be obscene websites, illegal proxy servers, Autonomous System (AS) numbers in banned countries, and/or dark web, etc.). Additionally, users can define their own custom rules that will be used by the Platform via the custom rules engine 303 to filter requests 210.

Request syntax and semantics checker 324 confirms that the request 210 has correct syntax and semantics for performing an operation on the endpoints. This includes inspecting the request parameters such as the protocol that needs to be used in handling the operation and/or validating other related parameters. For example, if the original request is to run a ping or traceroute command to an Application domain server from different endpoints, then the request syntax and semantics checker 324 may confirm that the IP address for the same is correctly provided. Similarly, for an HTTP transaction, headers, URLs and associated scripts may be checked for correctness before the request is sent to the endpoints for execution. Rejections may be sent to Clients along with detailed information about the syntactical and semantic issues found. Metrics may be logged at each step for performance analysis and troubleshooting of issues via metrics 380.

Figure 3E:
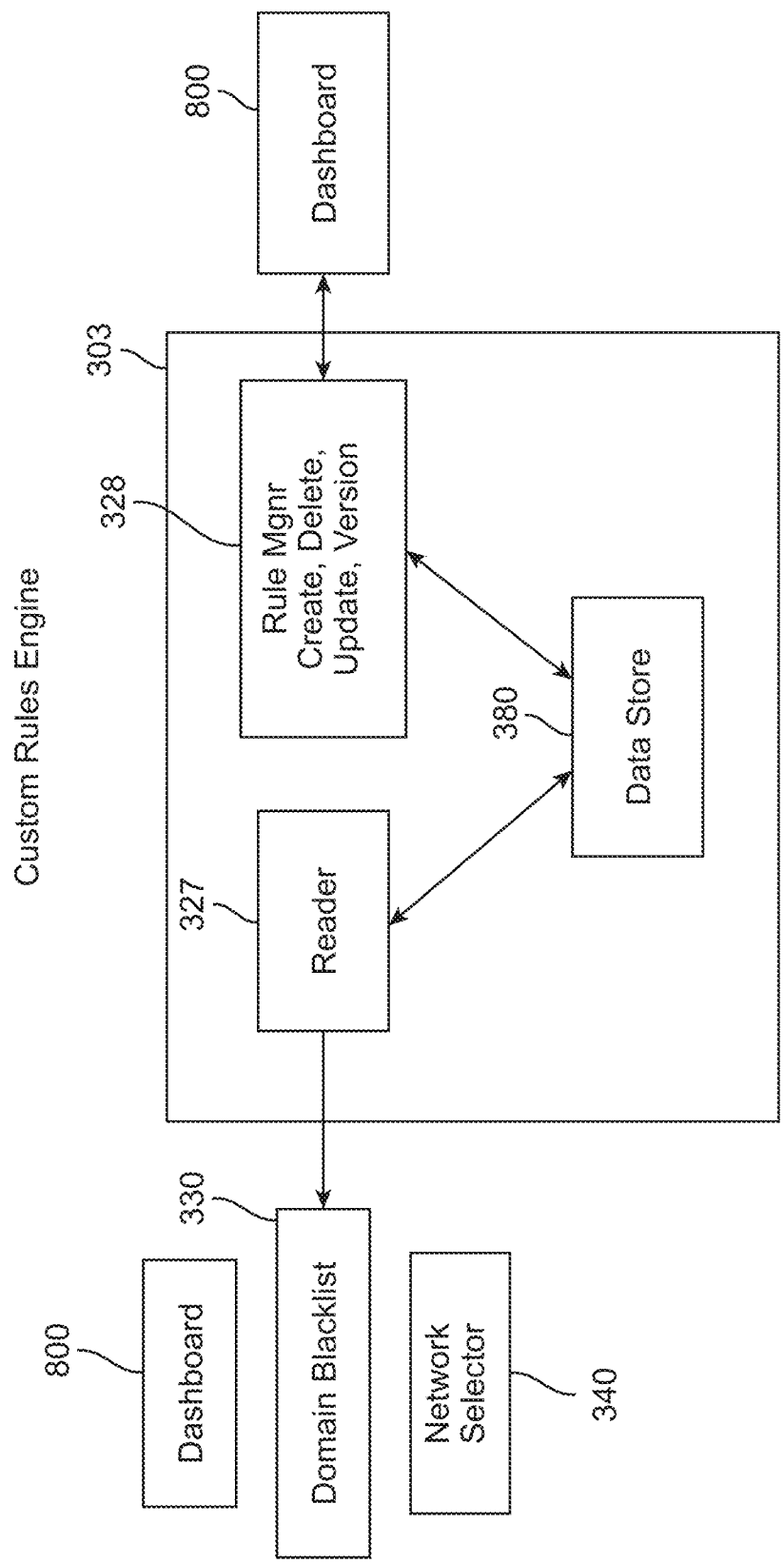
FIG. 3E illustrates a flowchart of a custom rules engine, according to some embodiments of the disclosure.

FIG. 3E illustrates a flowchart of a custom rules engine 303, according to some embodiments of the disclosure. The custom rules engine 303 may include a reader 327, a rules manager 328, and a data store 380. The reader 327 may read rules from the domain blacklist 322 to determine whether the custom rules defined by the user contradicts with the list of objectionable destinations managed by the domain blacklist 322. Custom rules can be defined by users from dashboard 800 via the rules manager 328. Data store 380 is a persistent data storage that stores the custom rules defined by the users via the rules manager 328. The custom rules engine 303 manages the lifecycle of the custom rules and exposes the custom rules to be used by other modules such as, an example, the domain blacklist 322.

The custom rules are based on any request parameters like port, protocol, specific destination domains or IPs. The custom rules provide the system with the actions to be taken such as, for an example, block all traffic on port 25, or process SSH requests on port 22, or take specific routing actions to route all HTTP traffic to a certain domain only via endpoints in a certain region, or limit the number of HTTP requests that can be sent to a specific domain. Additionally, custom rules may be sender identity based. For example, one team within an organization with a given ClientID and API key may be allowed to monitor border gateway protocol (BGP) route changes to key secret servers from a given set of endpoints. However, other teams within the organization may be denied access to perform the same operation.

Assuming the request 210 successfully passes through the traffic filter 320, the request next moves on to the traffic shaper 330.

Figure 3F:
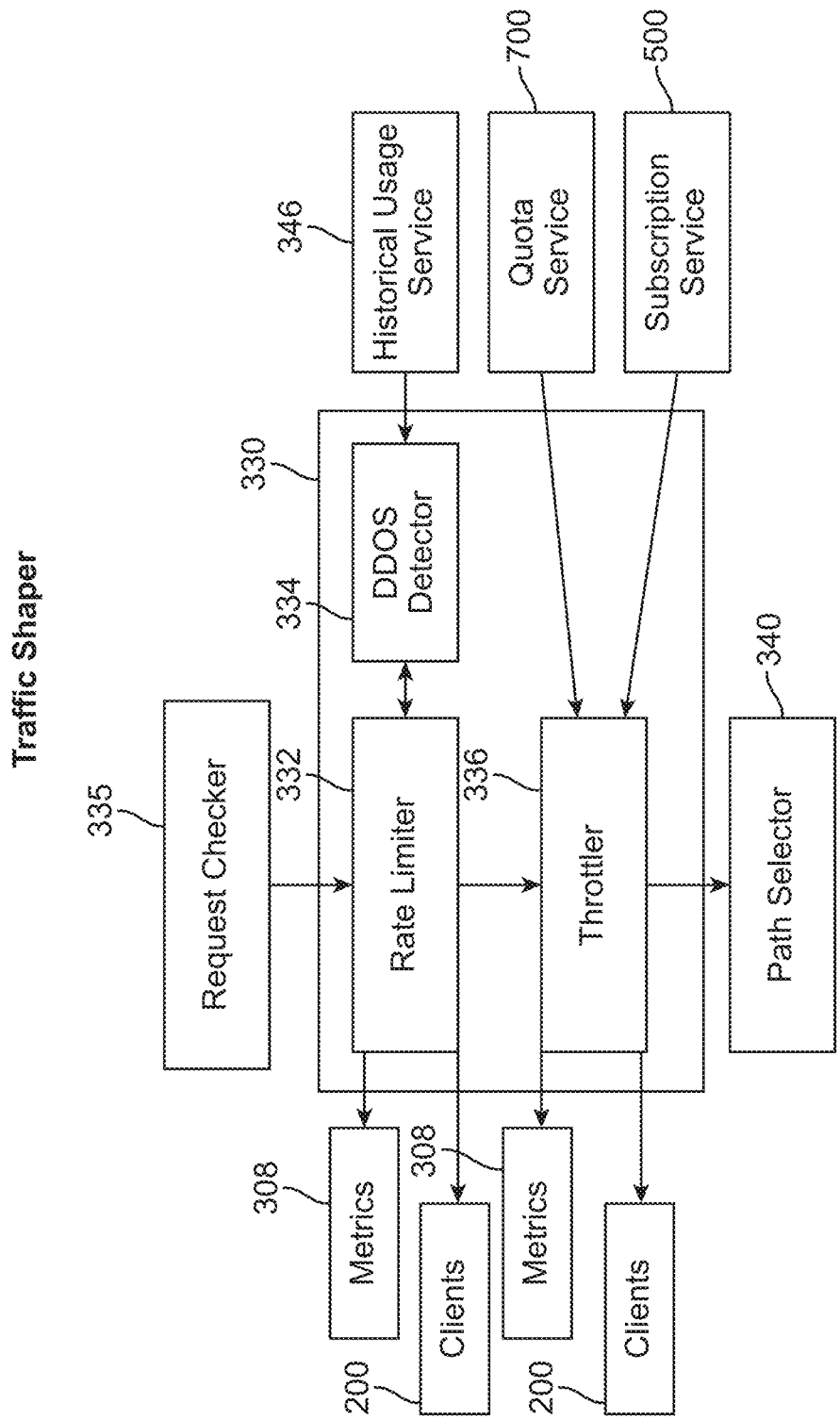
FIG. 3F illustrates a flowchart of a traffic shaper, according to some embodiments of the disclosure.

FIG. 3F illustrates a flowchart of a traffic shaper, according to some embodiments of the disclosure. The traffic shaper 330 may check an incoming client request to check the total amount of traffic received by the Platform from a Client per second. The traffic shaper 330 may include a rate limiter 332, a distributed denial of service (DDOS) detector 334, and a throttle 336. Users are only allowed to send traffic at a certain baseline rate, such as, an example, transactions per second (TPS). The rate limiter 332 checks each request 210 to see if a baseline is breached. In case of a breach, DDOS detection 334 analyzes the current request in relation to historical requests made in the recent past to detect any possible DDOS attack patterns. Rejection with prescribed request rates are sent back to the clients for review and adjusting their request rate accordingly. Assuming the request 210 successfully passes through the rate limiter 332, the request moves on to the throttler 336.

The throttler 336 retrieves the resources the user can access using subscription service 500. The throttler 336 then retrieves the available capacity and quota allocation from quota service 700 for the resources based on the request sender profile. For example, the Platform may find that a perfectly correct and genuine request (e.g., a valid client request for routing via a particular endpoint). However, upon an inquiry with the quota service 700, it may be determined that there may not be available capacity and resources to fulfill the client request using an endpoint because, as an example, the amount of traffic that has been routed through that endpoint have exceeded available capacity and quota for the time being. Rejections with prescribed corrective actions are sent back to the clients. These prescribed corrective actions may include instructions, for example, retry sending request after a certain amount of time or retry using a different endpoint location. Metrics are again logged at each step via metrics 380 for performance analysis and troubleshooting of issues.

Assuming the request 210 successfully passes through the traffic shaper 330, the request next moves on to the path selector 340.

Figure 3G:
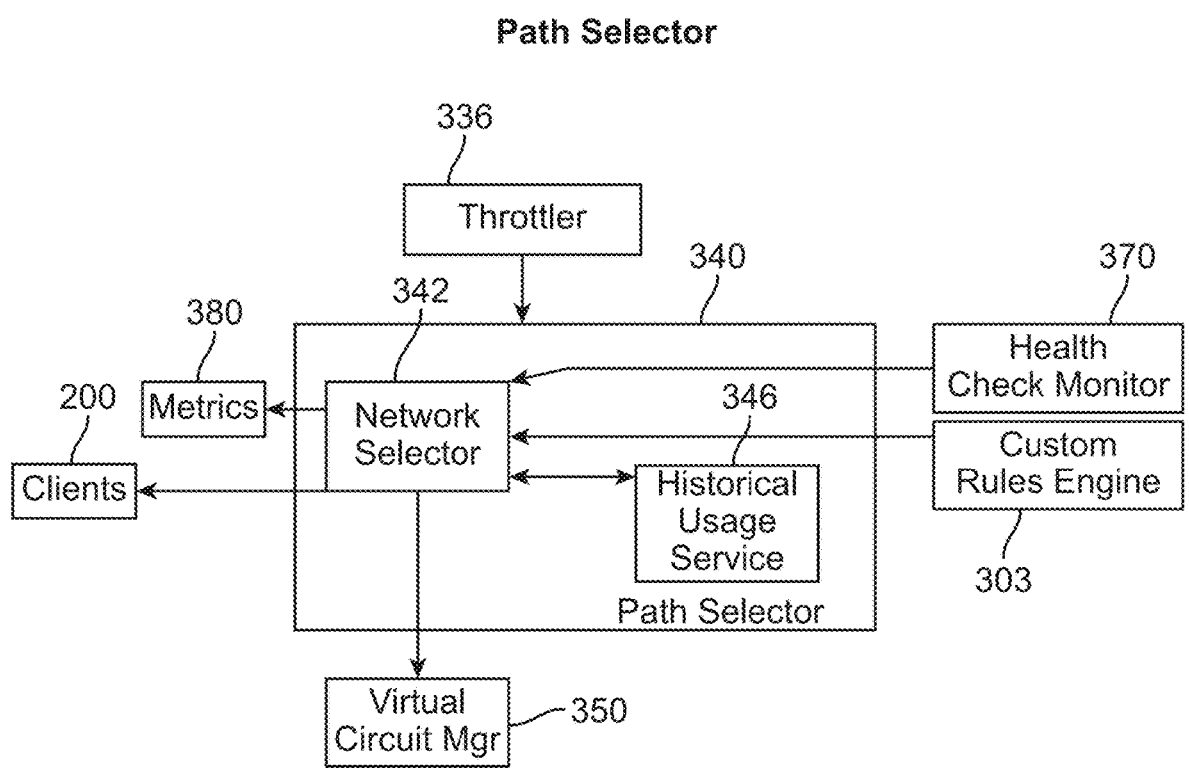
FIG. 3G illustrates a flowchart of a path selector, according to some embodiments of the disclosure.

FIG. 3G illustrates a flowchart of a path selector, according to some embodiments of the disclosure. The path selector 340 includes network selector 342 and historical usage service 346. The network selector 342 determines a path for routing the request 210 which includes the specific endpoint and a specific network within an endpoint. In some embodiments, an optimal path may include a maximum performance path (e.g., lowest latency) and a maximum chance of executing the request at the Application from the endpoint while avoiding blocks and detections.

Network selector 342 interacts with a number of different services to select a path to an endpoint and in some embodiments, a specific network within the endpoint. Path selection is based at least in part on instructions provided in the request 210. For a new request that does not have any existing virtual circuit mentioned in the request parameter, the process starts with the network selector 342 inspecting the incoming request and associated parameters first and determining information about the sender, destination endpoint location, protocol, port and operations specified in the request. Based on this information, Network selector 342, will work with health check monitor 370 to identify an endpoint with available capability and/or capacity for executing the Client request. If this information is missing from the Client request, an automatic path selection is made. Historical usage service 346 is called to validate if the selected path has low probability of getting blocked or detected based on historical data. Historical usage service 346 returns the usage of the specific path for the specified requestor+endpoint destination over a period of time (e.g., 24 hours). The network selector 342 uses this information to determine if it can send the request over the specified path or send a retry/rejection message to the clients. For example, an unusually high number of requests reported by historical usage service using the specified path may lead to rejection and retry request being sent to the client because the particular specified path may have been overused or the request may take the particular specified path to a state of being overused.

Additionally, custom rules engine 303 may be queried to check the request against any custom rules before sending via selected path for execution. For example, a BGP route monitoring request can be executed only from network endpoints which are configured to support it. An appropriate error code is sent back to clients trying to send a BGP route monitoring request via an incorrect destination location. The error code will provide details to Clients for retrying their request with different options or at another time if resources are not available or custom rule checks fail.

Network selector 342 may decide the path for any request where the user has not specified any destination location details or existing virtual circuit details to be used for execution. The network selector 342 may include other details in the Client request to determine the appropriate path. For example the domain name (.com, .ca, .au, .in etc.) of the destination Application in the request may be used to identify the country location for selecting an endpoint The network selector 342 has a live detailed inventory of endpoints and their capabilities retrieved from the health check monitor 370 which the network selector 342 can use to generate a selection of possible endpoints that can be used for routing. Additionally, historical usage service 346 and custom rules engine 303 are utilized to filter and select the best available and fastest path for executing the request 210.

Additionally, network selector 342 may look at other parameters for making the path selection such as, for example, time of day of receiving Client request, year of month of receiving Client request, type of destination Application and/or protocol specific checks to decide the endpoint networks and available internet protocols to be used. For example, sending a HTTP request with a ".sg" domain, the network selector 342 may automatically select a path from Singapore based networks first. If selected path is not available the network selector 342 attempts to locate the nearest network (e.g., Hong Kong, China etc.) to optimize performance. Similarly, for performance monitoring of a website (destination Application) during, as an example, "Black Friday", a huge consumer shopping event the day following Thanksgiving in the U.S.A., the network selector 342 may spread out HTTP(s) health monitoring requests to a domain from the widest possible set of endpoints. Custom rules engine 303 may be used to extend these checks and provide criteria for further path filtering for optimal selection.

Historical usage service 346 provides a path usage details of any historical traffic sent to a destination location and application combination from a specific sender. Network selector 342 may call the historical usage service 346 with a path identified for a request. Historical usage service 346 may return the number of times a specific path was used in the 24-hour period for the destination location+destination application+sender combination. Network selector 342 may use the information received from the historical usage service 346 to determine if it will be safe to send this current request to the destination using the same path without the traffic being blocked or detected as, as an example, possible spam. Metrics for operations by the different modules/services may be logged and made available for troubleshooting and performance analysis by metrics 380.

Once the path selector 340 selects an optimal network path, the optimal network path information, along with the request 210 is sent to a virtual circuit manager 350 to configure a virtual circuit for the request 210.

Figure 3H:
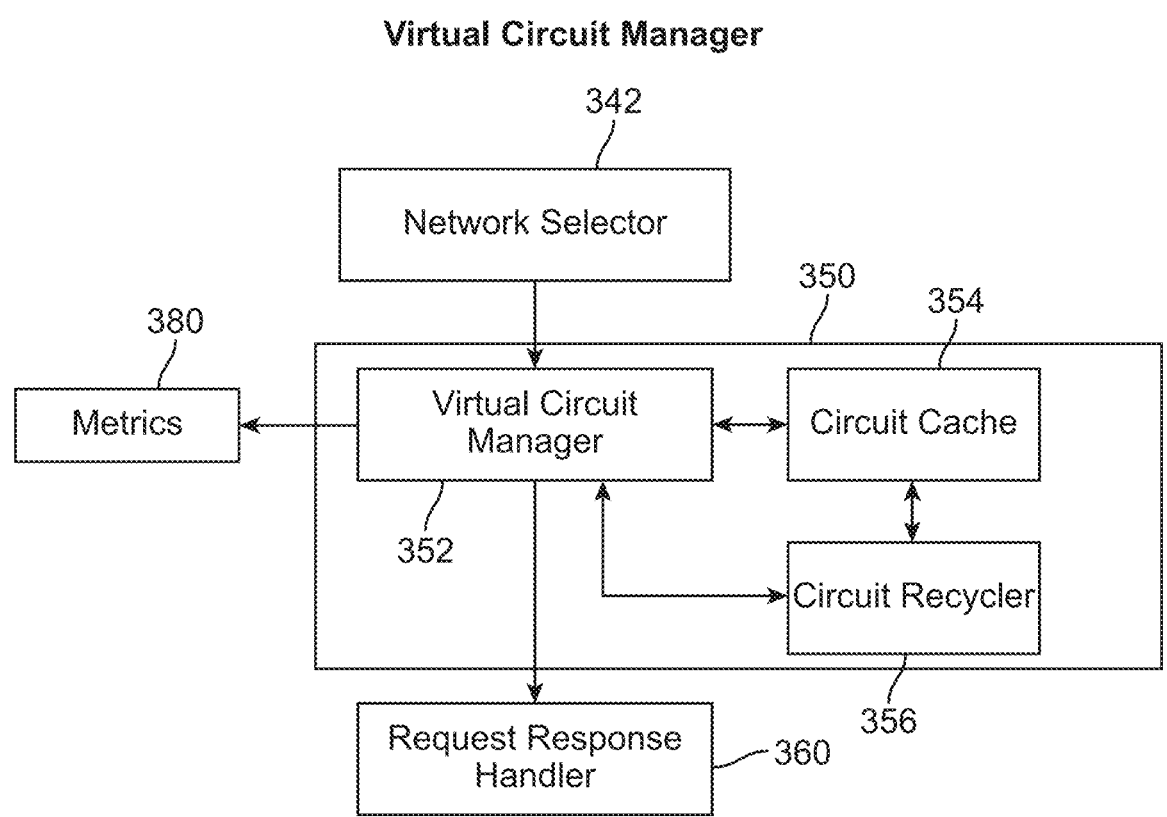
FIG. 3H illustrates a flowchart of a virtual circuit manager, according to some embodiments of the disclosure.

FIG. 3H illustrates a flowchart of a virtual circuit manager, according to some embodiments of the disclosure. The virtual circuit manager includes a virtual circuit manager module 352, a circuit cache 354, and a circuit recycler 356. Virtual circuit manager module 352 receives input from the network selector 342 to create a unique virtual circuit ID (e.g., unique circuit ID 142) that is associated with the requestor information+request details+path combination determined from the input information received from the network selector 342. The input information received from the network selector 342 may include the optimal network path information and the request 210. The virtual circuit ID may be used to uniquely identify an operation/transaction as the operation/transaction travels to and from the different services and subsystems of the Platform. This construct (e.g., the virtual circuit ID) allows software defined controls to clients for routing and managing their respective requests without having to know anything about the underlying hardware and networks. For example, as HTTP traffic is sent through the Platform, the virtual circuit ID is included in the HTTP header portion of the HTTP traffic so that the Platform may be able to uniquely identify the HTTP traffic and report metrics and such. A person having ordinary skills in the art may appreciate other types/protocols of traffic may be sent through the Platform other than HTTP traffic. If other types/protocols of traffic are used, the virtual circuit ID may be included in those other types/protocols to associate the request with the virtual circuit ID for tracking of the requests as the requests and their associated responses are received and routed through the Platform. This may also include end-users viewing/interacting with the Application (e.g., Application 160) as if the request to view/interact with the Application originated from a specific geographic location of the endpoint defined by the request.

Once created, the virtual circuit ID may be cached in a circuit cache 354. For any subsequent request that specify an existing circuit (via the unique circuit ID), this cache may be quickly queried for determining the appropriate routing without the Platform having to go through the previous steps of setting up the virtual circuit for each and every Client request that wants to reuse any existing virtual circuit ID. In some embodiments, the subsequent requests may include the virtual circuit ID such that a request may include a simulation of an interactive session with the destination application (e.g., Application 160) using the endpoint that is associated with the virtual circuit ID used to process a different operation via the same virtual circuit.

Circuit recycler 356 may recycle entries in the circuit cache 354 to expire any virtual circuits. Expiration of virtual circuits may be based at least in part on explicit user commands or rules that allow circuits to live only for a prescribed TTL. Virtual circuits may be expired automatically for security concerns to prevent, as an example, abuse of system resources. As discussed above, operations are logged by metrics 380 for performance analysis and future troubleshooting.

Once the virtual circuit manager 350 generates the unique virtual circuit ID, the virtual circuit information (having the virtual circuit ID), along with the request 210 may be sent to a request response handler 360 to route the request 210 to endpoints as described in the virtual circuit information.

Figure 3I:
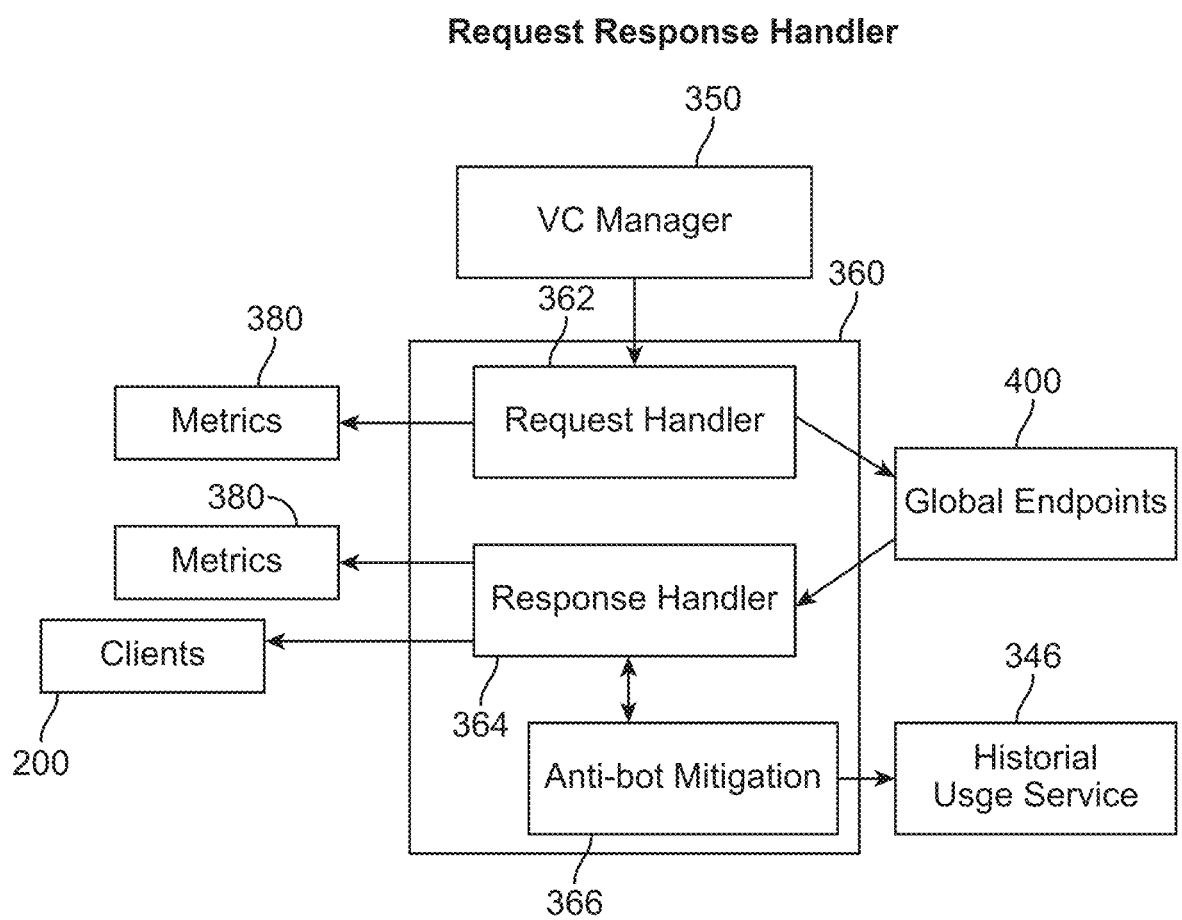
FIG. 3I illustrates a flowchart of a request response handler, according to some embodiments of the disclosure.

FIG. 3I illustrates a flowchart of a request response handler, according to some embodiments of the disclosure. Request response handler 360 may include request handler module 362, response handler module 364, and anti-bot mitigation module 366. Request handler module 362 receives the virtual circuit information along with request details from the virtual circuit manager 350. Request handler module 362 performs the actual routing of requests to the endpoints 400 included in the virtual circuit information. Request handler may add specific end-user emulation instructions to be executed at the time of execution at the endpoints 400. For example, these instructions may include the headers, cookies, the device fingerprint, mouse movements, scrolls etc. to be included in the request sent out to a destination Application (e.g., Application 160) accessed using HTTP(s) protocol via the endpoints 400. Secured communication transfer protocol may be used with the endpoints 400 to send the request and virtual circuit information for further processing. In some embodiments, one or more requests may be sent to one or more endpoints based on the operation specified in the original request. For example, an original request may include an operation request of a ping command to be sent to a destination application via/using all endpoints available in a given country may lead to establishing multiple connections and sending multiple requests.

Endpoints 400 may be stateless routers that accept the request, process the inputs, execute the operations against destination Application and then send the response obtained to the response handler.

Response handler module 364 is responsible for taking response results received from endpoints 400 for a given request execution and sending the response results back to the Clients 200. In addition to routing the response results, the response handler module 364 is also responsible for formatting the response for the Clients and collating results from multiple request executions if results need collating. For example, the response handler module 364 may collate ping results received from multiple endpoints, as discussed in an earlier example, and format the ping results information for consumption in a suitable format for the client 200.

Response handler module 364 also checks to make sure the request was operated upon successfully. Response handler module 364 may also review responses received from the endpoints 400 for possible issues such as, an example, blocks issued by a website using a Captcha. In this case, response handler module 364 works with the anti-bot mitigation service 366 to either resolve the issue, for example, solve the Captcha, or resend the request for execution from a new network path with enhanced end-user emulation input to manipulate the destination Application(s) and Anti-bot systems to believe the request is originating from a real end-user trying to manually access/interact with the application, for example, via a browser.

Figure 3J:
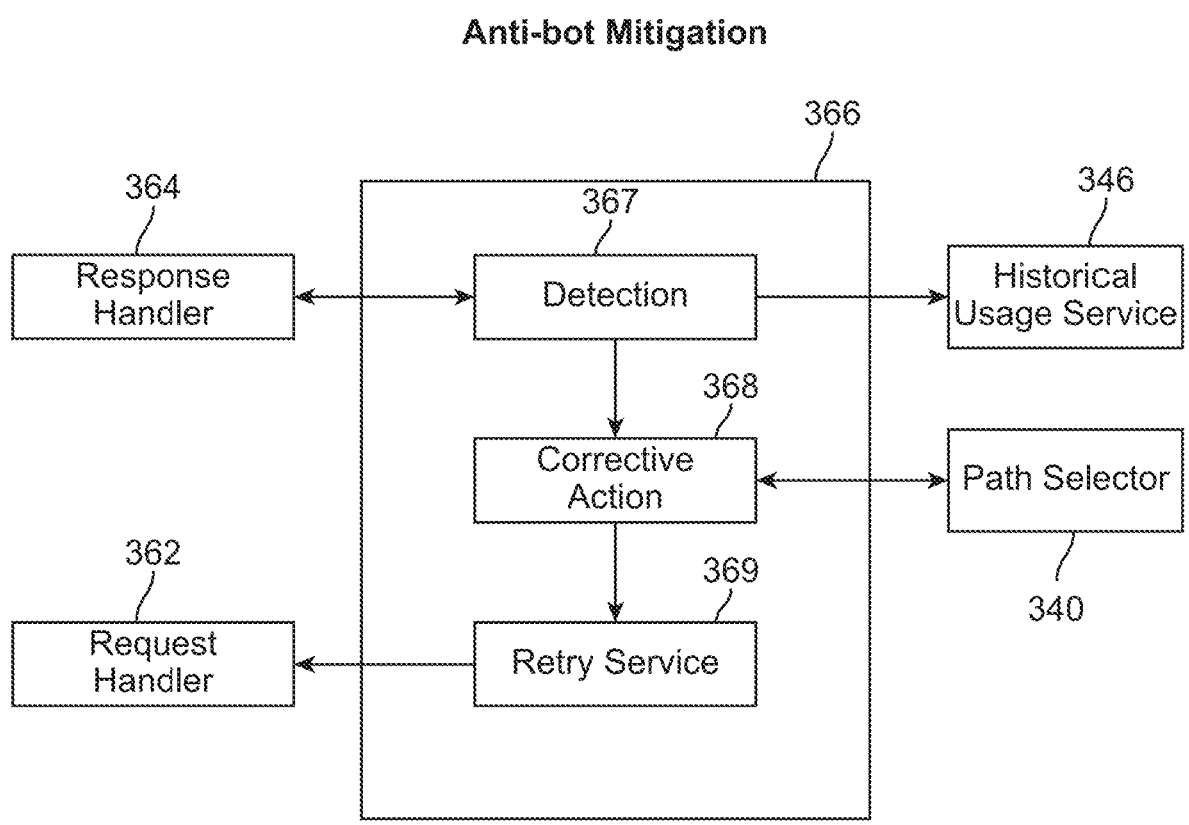
FIG. 3J illustrates a flowchart of an anti-bot mitigation service, according to some embodiments of the disclosure.

FIG. 3J illustrates a flowchart of an anti-bot mitigation service 308, according to some embodiments of the disclosure. Anti-bot mitigation service module 366 includes detection module 367, corrective action engine 368, and retry service 369. Detection module 367 detects blocks and captchas, if any, that are a part of the Application response collected from the endpoints 400. Blocks may be errors received while accessing destination Application from an endpoint 400. A block may happen because the destination Application may reject a request because the requestor does not have access to the requested Application, the request was not formatted in a way expected by the Application or there was a runtime error encountered by the Application while trying to service the request. A captcha is a program or system intended to distinguish human from machine input, typically as a way of thwarting spam and automated extraction of data from websites. If Application 160 suspects the request is originated by a machine, the Application 160 may implement a captcha to block the request. If the endpoint 400 reports a request is blocked or if there is a captcha at the Application 160, this information pertaining to errors/blocks and/or captchas is retrieved by analyzing the information (e.g., text) received within the response body and the information is sent to a corrective action engine 368.

The corrective action engine 368 uses the information from the Detection module to identify the best way to avoid a block or captcha based on the errors received in the Application response from the endpoint 400. The corrective action engine 368 is responsible for identifying a new set of request parameters and/or a new network path using the Path selector for resending the request for execution. To increase the chances of avoiding a block/captcha the corrective action module generally identifies a new/different set of end-user emulation instructions such as, for example, headers, cookies, device fingerprint, mouse movements, scrolls etc. for an HTTP request to a destination Application usually accessed via a browser for an end-user. The corrective action engine 368 may retry the sending request using retry service 369 and request handler module 362 with a set of updated request inputs not originally supplied in the request and/or a new network path. Any failures and successes are reported to the historical usage service 346 to help avoid hitting the same issue when another path for a similar request is being selected. Depending upon the protocol used and available capacity at endpoints, only a finite number of retries are conducted before sending an error message to the Client 200 to retry the request at a later time and using new destination endpoint locations.

Figure 3K:
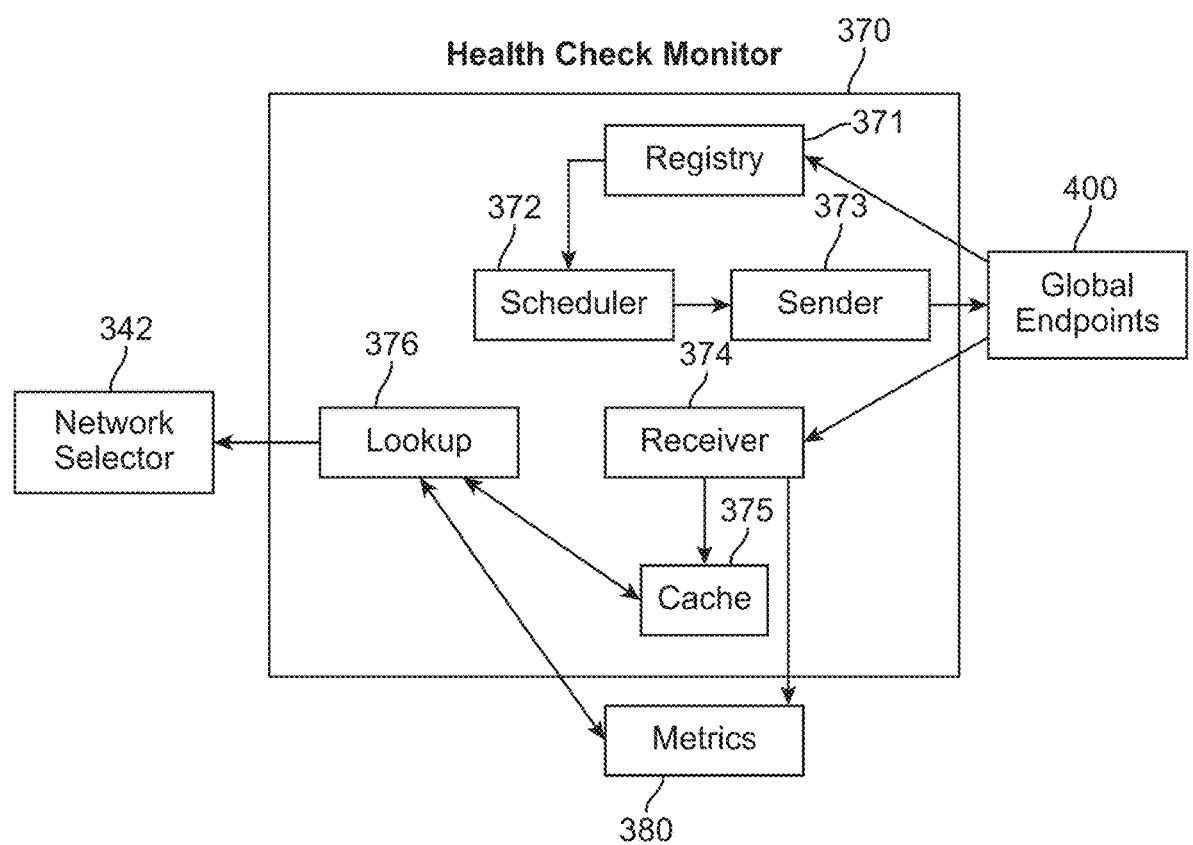
FIG. 3K illustrates a flowchart of a health check monitor, according to some embodiments of the disclosure.

FIG. 3K illustrates a flowchart of a health check monitor, according to some embodiments of the disclosure. Health check monitor 370 is an independent software module that executes independently from other modules but is used by the other modules. The health check monitor 370 is responsible for ensuring that cloud routing platform 300 can communicate with other systems and specifically endpoints 400 to successfully process user requests. The health check monitor 370 includes a regional registry 371, a scheduler 372, a sender 373, a receiver 374, a cache 375, and a lookup 376. Each time an endpoint is provisioned, the endpoint 400 sends a heartbeat to a regional registry 371. Once registered by the regional registry 371, a series of health checks are executed using the scheduler 372 and sender 373 which requests the endpoints to execute multiple checks on themselves and report the results.

The endpoints report the results to the receiver 374 which caches results such as, for example, uptime, availability and network latency into cache 375. Additionally, the receiver 374 stores results into the Metrics service 380. Reported results and metrics depend upon the type of endpoint in question. For example, an endpoint with a single server and network might only report availability of a single network and its latency. An endpoint with tens of disparate consumer grade networks and datacenter networks however will report these metrics for every single network connection available for use within the endpoint. Data stored in the cache 375 and metrics service 380 are exposed via a lookup service 376 which serves requests from other modules like network selector 342 to report the status of different endpoints metrics.

Figure 3L:
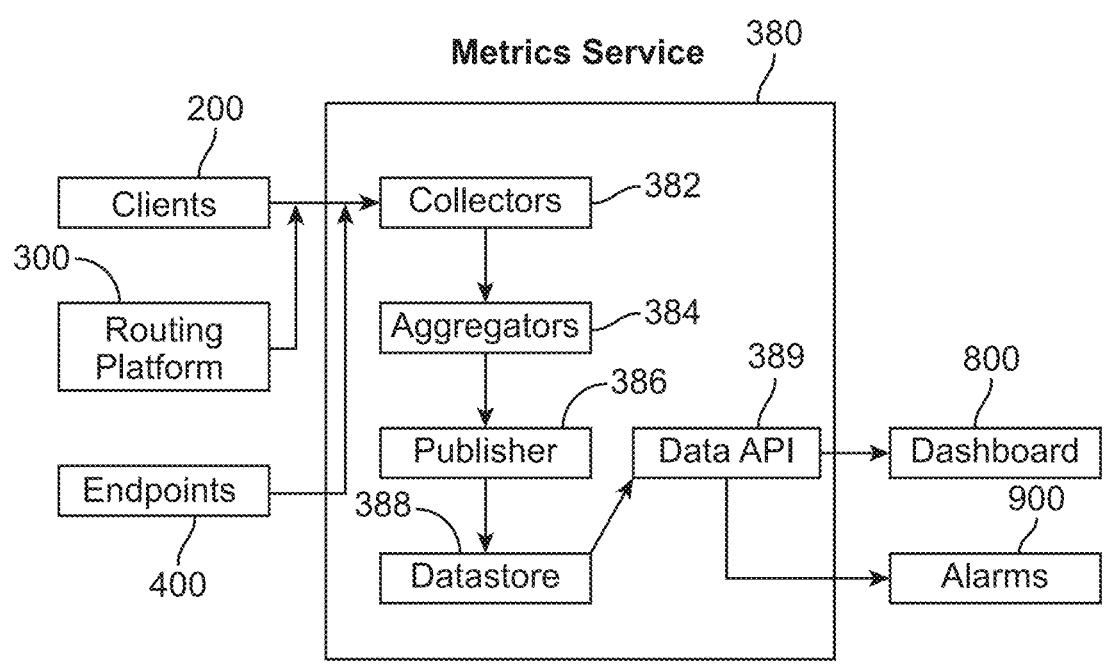
FIG. 3L illustrates a flowchart of a metrics module, according to some embodiments of the disclosure.

FIG. 3L illustrates a flowchart of a metrics service, according to some embodiments of the disclosure. Metrics service 380 is an independent software module that interacts with multiple systems within the Platform. Metrics service 380 is a store for the multiple systems to write any metric/log data and also retrieve metric/log data.

Architecturally, the metrics service 380 has different type of metric collectors for different type of systems the metric service 380 is interacting with. Clients 200, for example, may report metrics which are collected by a dedicated client collector. Similarly, metric collectors for collecting metrics from routing platform 300 and endpoints 400 are different. These metric collection collectors/modules parse, process and store information differently based on the source of the data received by the metrics service 380.

Metrics service 380 includes metric collectors 382, metric aggregators 384, metric publisher 386, metric datastore 388, and metric data API 389. Metric aggregators 384 are responsible for reconciling data from different sources where applicable. For a request, for example, metric aggregators 384 collates metrics from different systems (e.g., clients 200, routing platform 300, and endpoints 400) and stores them as a series of related steps. Different metric aggregators use different types of aggregations based on their function and type of information. For example, one aggregation module might use virtual circuit information in a request to reconcile the entire flow across different systems. Another aggregator for endpoints may use metrics to report the uptime, availability and issues with endpoints on a timeline.

Metric aggregators 384 may use metric publishing modules 386 to store different kinds of metrics data into aggregated and raw views in different kinds of metric datastores 388. Depending upon the nature of data and view stored, multiple kinds of metric datastores 388 may exist. Endpoint status, for example, may be stored both in a relational and non-relational datastore. For example, a client rejection for a request may only be stored in a non-relational datastore. The data and views of metric data stored in the metric datastore 388 may be exposed to other systems via a metric data API 389. The metric data API 389 may be used by other systems such as, as an example, dashboard 800 and alarms 900 to retrieve data from the metric datastore 388 as needed.

Figure 4A:
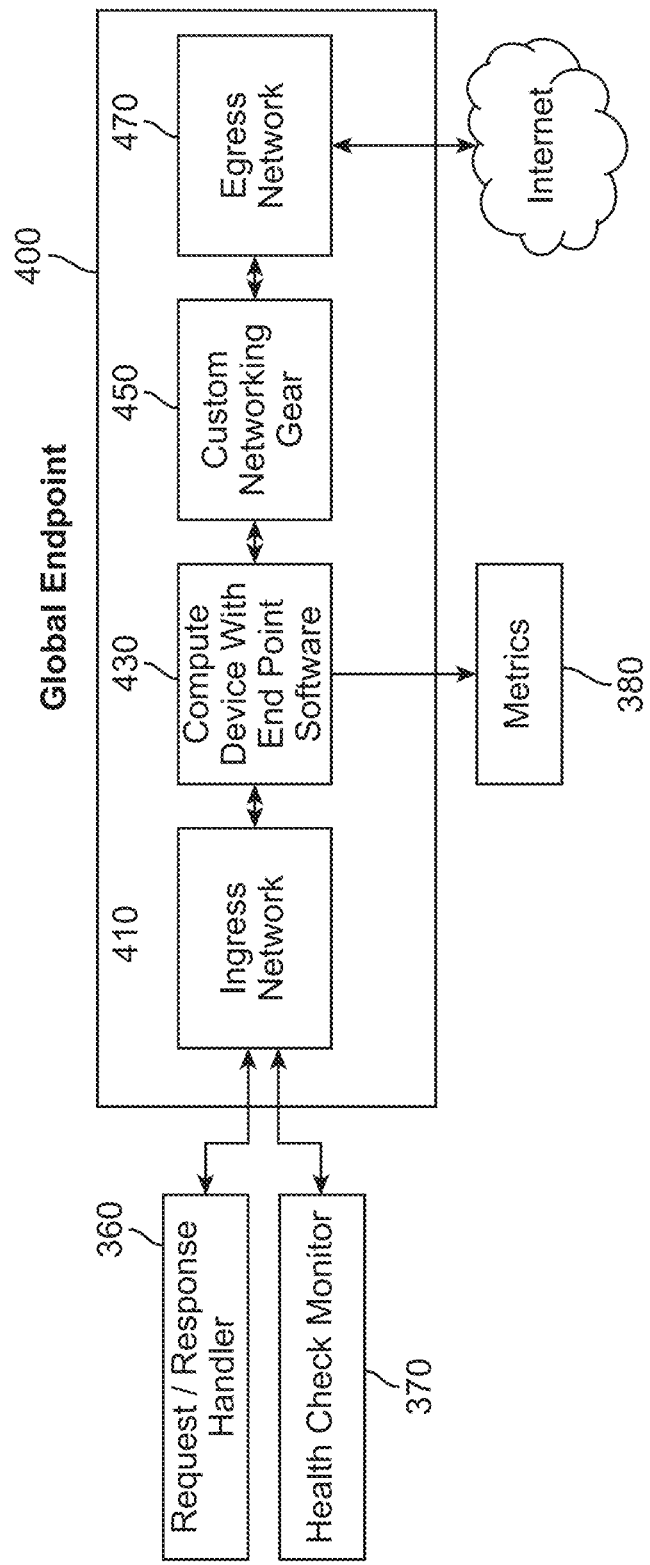
FIG. 4A illustrates a high-level architecture view of an endpoint, according to some embodiments of the disclosure.

FIG. 4A illustrates a high-level architecture view of an endpoint, according to some embodiments of the disclosure. Endpoints may be designed to be stateless routers, which support routing traffic of different internet protocols like HTTP(s), ICMP, SMTP etc. There may be different types of endpoints based on the hardware, networks and customizations to build them. In general, endpoints may have the following high-level architecture as shown in FIG. 4A. Global endpoint 400 may include an ingress network 410, a compute device 430, custom networking gear 450, and an egress network 470. Ingress network 410 routes requests from components of cloud routing platform 300 to the compute device 430 that has endpoint software 530 (not shown). Ingress network 410 also sends back the responses to these components of the cloud routing platform 300 from the custom endpoint software 530 via the request/response handler 360. Additionally, ingress network 410 may also provide continuous communication with health check monitor 370 to provide information on the status of the endpoints 400.

Compute device 430 may be a server(s) having processors, RAM and storage to host a custom endpoint software 530. The operating system(s) on these computing devices 430 may be highly customized and optimized specifically for fast networking operations. This compute device 430 may be connected/communicatively coupled to the ingress network 410, wherein the ingress network 410 provides the incoming network bandwidth and network path to the compute device 430. The compute device 430 with custom endpoint software is also connected/communicatively coupled to one or more custom networking gear 450. Custom network gear 450 may include switches, routers and any other custom devices which are used to interface, manage and route traffic to and from multiple egress networks 470. Depending upon the type of egress networks used, there may be different setup, configuration and customization for the networking gear 450.

Egress networks 470 may be different types of consumer and business grade networks which are used as an exit network to route the requests (e.g., request 210) to destination Applications via the public Internet. The different types of networks may include consumer-based lines such as, for example, digital subscriber line (DSL), broadband, cable-based connections, consumer fiber, mobile connections, etc. Additionally, the different types of networks may also include business-based networks such as, for example, dedicated Internet access (DIA) circuits or Business Fiber connections. These different types of networks define the capabilities of the endpoint. The choice of the networks is dependent on various factors such as, for example, availability of different kinds of networks and hardware in a given geography, velocity for deployment, budgetary constraints in building an endpoint and protocol support, just to name a few.

Figure 4B:
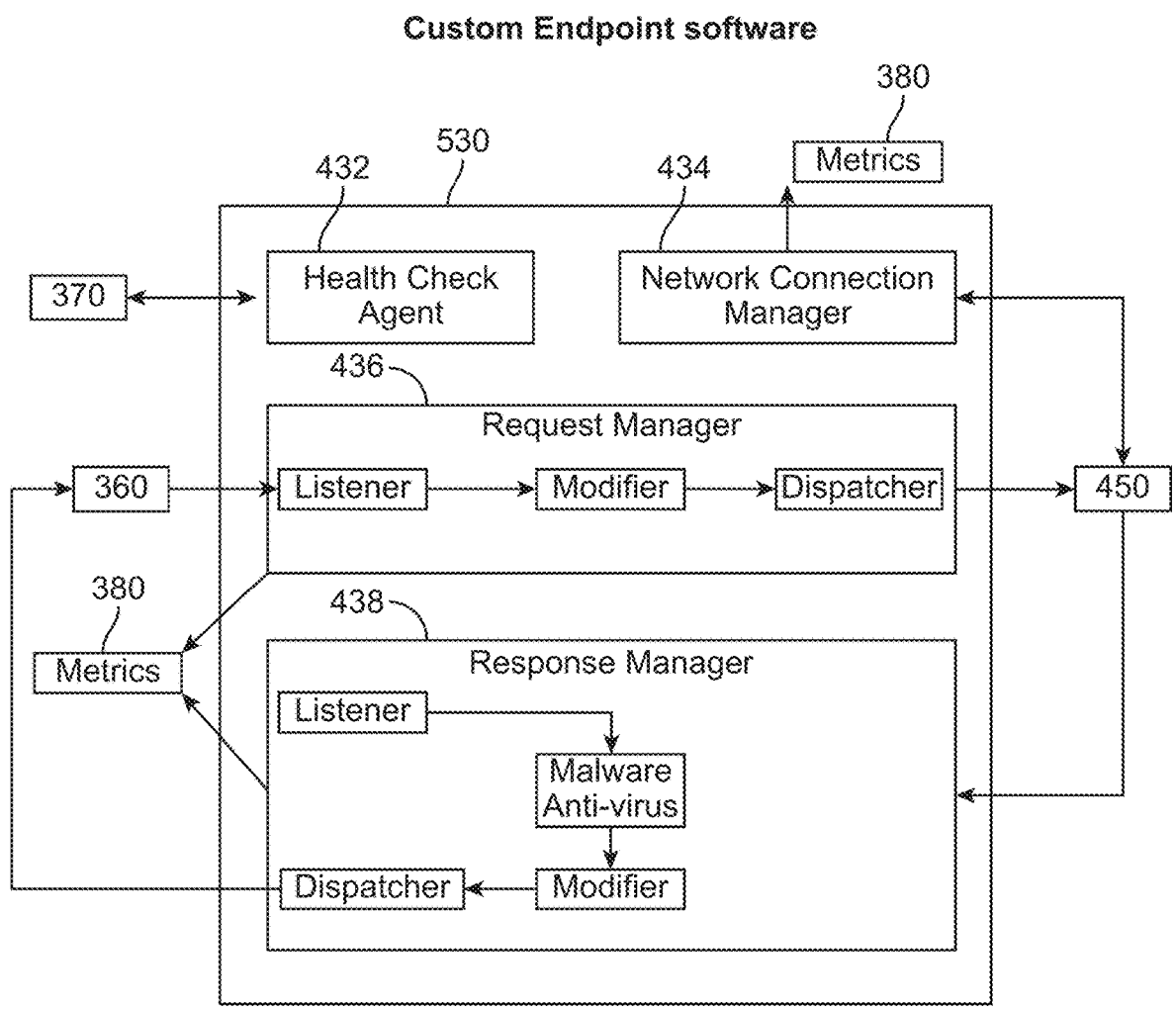
FIG. 4B illustrates a flowchart of an endpoint software, according to some embodiments of the disclosure.

FIG. 4B illustrates a flowchart of a custom endpoint software, according to some embodiments of the disclosure. Compute device 430 with the custom endpoint software 530 forms the heart of the design of any endpoint. The custom endpoint software 530 is the component which makes the endpoint securely available to communicate with the cloud routing platform 300. Furthermore, the custom endpoint software 530 executes and performs operations to route user requests, perform routing via one or more egress network 470 over the Internet, manage the responses received from the destination Applications, and send the responses back to the cloud routing platform. While the specific implementations of the custom endpoint software 530 may vary based on the hardware platform and type of endpoint being designed, generally, the custom endpoint software 530 has the same high-level architecture described below.

Custom endpoint software 530 may include a health check agent 432, a network connector manager 434, a request manager 436, and a response manager 438. Health check agent 432 may work with health check monitor 370 to communicate the health, status, availability and workload of the endpoint with the cloud routing platform 300. Health check agent 432 may also execute and measure output of any operations received by the health check monitor 370 and report the results by to the health check monitor 370.

Network connection manager 434 is a module which may be responsible for managing egress network connections. For example, Network connection manager 434 may configure a Point-to-Point Protocol over Ethernet (PPPOE) connection for a DSL line being used as an egress network 470. Establishing, monitoring, disabling and re-establishing PPPOE connections for different DSL lines will be the responsibility of network connection manager 434. Depending upon the type of networking gear 450 and egress networks 470, network connection manager 434 may use different kinds of network management protocols, device drivers and network drivers to control different kinds of network.

Request manager 436 may interface with components of the cloud routing platform 300 via the request response handler 360 and metrics 380. The request manager 436 includes a listener, a modifier sub module and a dispatcher. The listener receives requests from the request response handler 360. The modifier sub module analyzes the virtual circuit details and the parameters of the incoming request to decide the operations that need to be performed. As a part of pre-processing, the modifier sub module reads the virtual circuit information to decide the actual network egress path which needs to be used for routing the request (e.g., request 210). The modifier sub module reads the incoming request to scrub off any proprietary or meta data information in the requests 210. The goal is to get the original request in a format and shape to be ready for being sent out over to the Internet using an egress network 470 using the protocol specified within the request 210. Dispatcher sub module then takes these requests and sends them out over the egress network 470 using the protocol specified along with any necessary parameters for routing. Operations may be logged into the Metrics service 380.

Tight perimeter security based on multiple practices such as, for example, firewalls, whitelisting of traffic and secure JWT token-based communication may be used to secure communications between endpoints 400, cloud routing platform 300 and the Internet. These controls are implemented at various layers, such as, for example, networking devices, compute devices and any networking equipment supplied along with the ingress and egress networks. Metrics for success and failure of operations by components may be recorded by the metrics service 380.

Figure 5A:
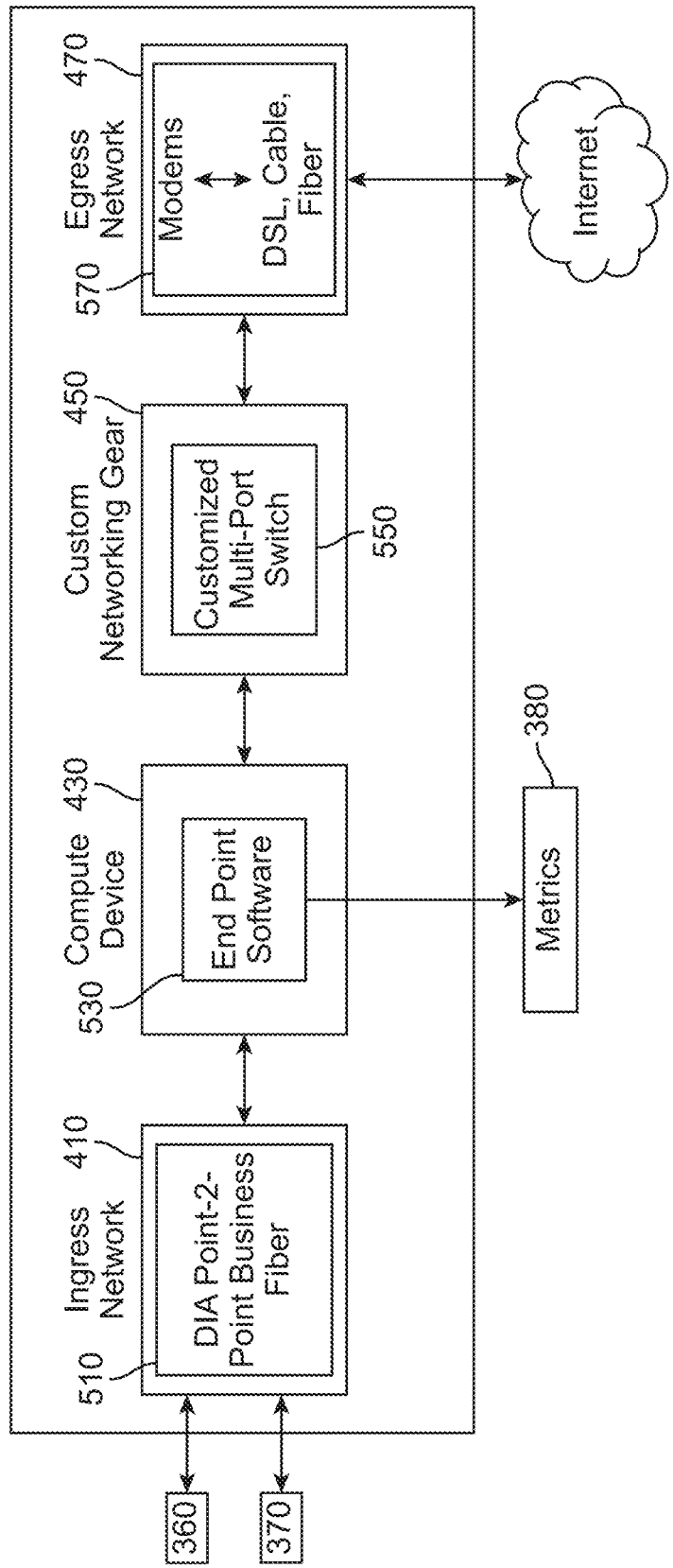
FIGS. 5A-5J illustrate different types of endpoints, according to some embodiments of the disclosure.

FIGS. 5A-5J illustrate different types of endpoints, according to some embodiments of the disclosure. Different types of endpoints may be implemented using different combinations of compute devices, custom software, ingress and egress networks. FIG. 5A illustrates an example endpoint using wired last mile networks like DSL, broadband and home fiber and custom switches, according to some embodiments of the present disclosure. In this embodiment, the compute device 430 is typically a server with custom software (e.g., endpoint software 530) running on it. The server usually has high processing power and multiple network interfaces that can interface with ingress and egress networks. On the ingress side (e.g., ingress network 410), this server interacts with cloud hosted routing platform using an ingress network 410 which can be a DIA circuit, a business fiber or a point-to-point connection (e.g., 510) between the server 430 and edge networks of the cloud providers hosting the cloud routing platform 300. Network security controls are implemented in devices (e.g., routers) which the ingress networks 410 are typically delivered/configured with. The server (e.g., compute device 430) is connected to custom networking gear 450 which, in this embodiment, is customized switches configured to work with multiple consumer grade fixed line networks.

Multiple egress networks 470 of different types, such as, for example, DSL, Cable, Home Fiber (e.g., 570) can be connected to the customized switches 450. These multiple egress networks 470 may be delivered with their own modems and routers. The modems and routers of the egress networks 470 may be configured to be kept in passthrough or bridged mode depending upon the design. These egress networks 470 may be extended to the switch 550 using ethernet handoffs. Customized switch 550 in this case is configured to allow the network connection manager 434 to control the consumer grade networks directly from the servers. The switch 550 may act as the device connecting the compute device 430 with the different egress networks 470. The number of physical egress networks 470 that may be included in the setup may be a function of the capacity of the switch 550 and the compute device 430.

Figure 5B:
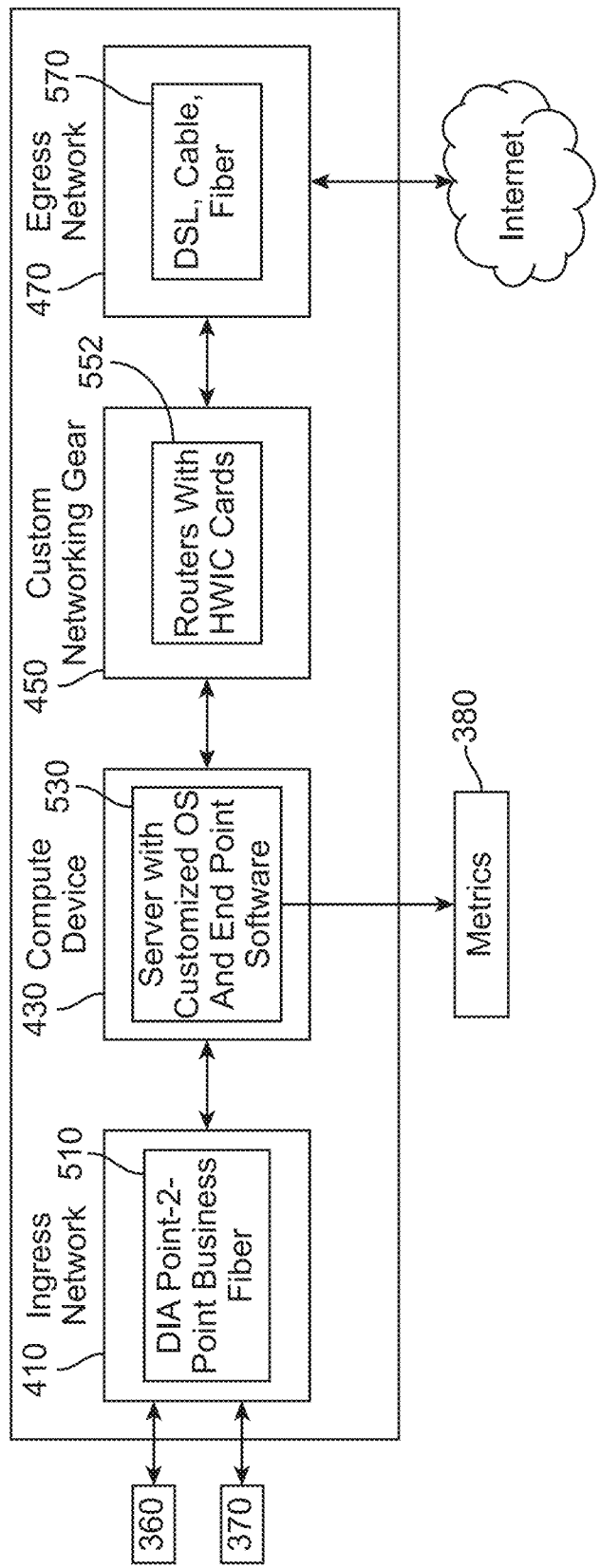

FIG. 5B illustrates an example endpoint using wired last mile network and custom routers (e.g., type 2), according to some embodiments of the present disclosure. There are types of consumer networks that may use commodity routers devices along with special High-Speed WAN (Wide Area Network) Interface Card (HWIC) cards (e.g., 552) to present the networks to the compute devices for management. This may happen because every country and telecom provider does not always use the same standards for implementation of their consumer grade networks. For example, different countries use different DSL class standards for implementation. In this embodiment, the choice of routers, HWIC cards and configuration make it different from Type 1 described above (e.g., FIG. 5A) while other parts of the design remain the same.

Figure 5C:
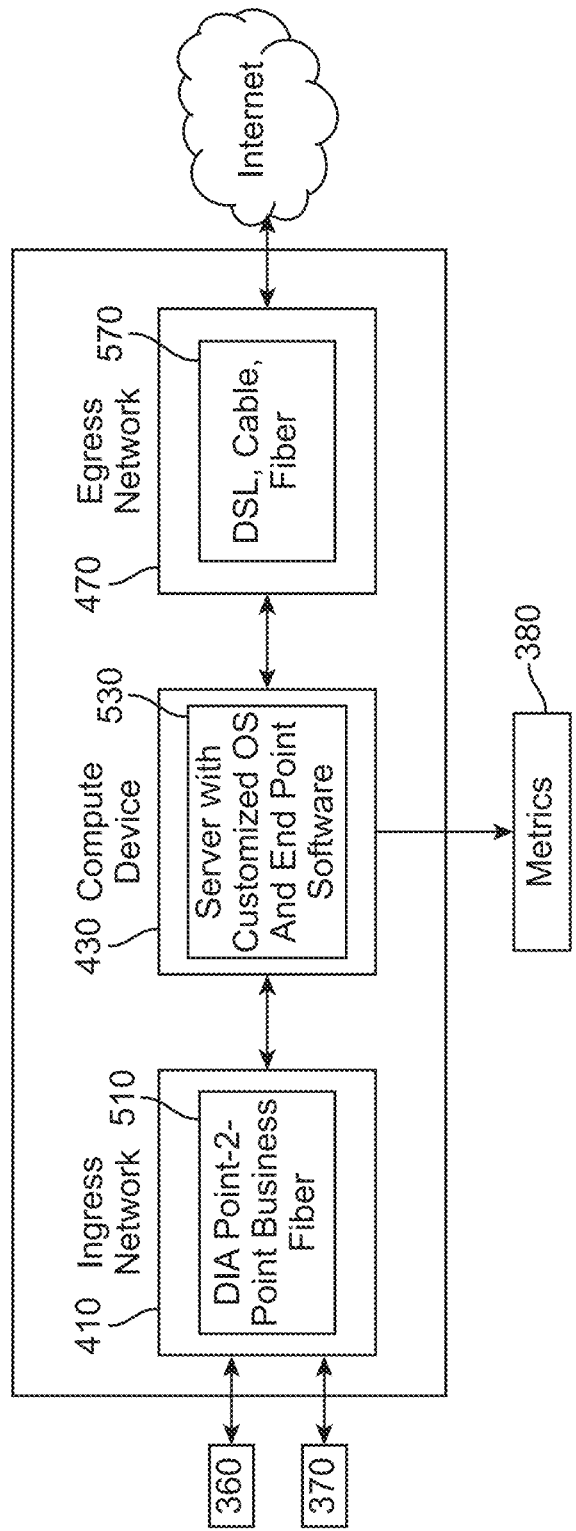

FIG. 5C illustrates an example endpoint using wired networks without using custom networking gear (e.g., type 3), according to some embodiments of the present disclosure. As a slight modification to the above embodiments (e.g., type 1 and type 2), the consumer grade networks maybe directly configured for use along with the compute device 430. These networks 570 may be delivered with their own modems and routers. These devices may be configured to be kept in passthrough or bridged mode depending upon how the network connection manager (e.g., network connection manger 434) needs to control these network circuits.

Figure 5D:
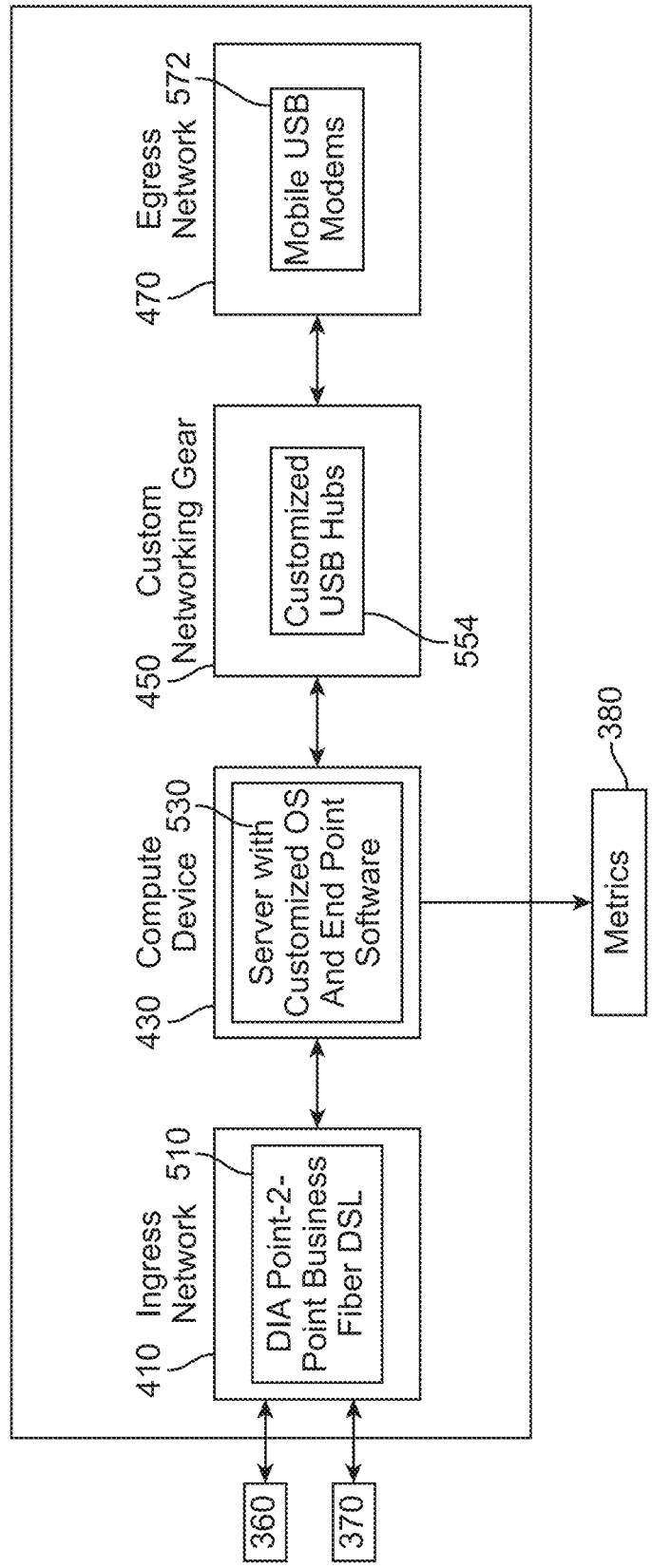

FIG. 5D illustrates an example endpoint using last mile mobile networks using custom networking gear (e.g., type 4), according to some embodiments of the present disclosure. In this embodiment, the custom networking gear may be replaced by multiport custom hubs 554 such as customized USB hubs. Multiple USB modems with SIM cards 572 can then be inserted in this hub to provide multiple egress networks 470. Network connection manager 434, in this embodiment, is not only responsible for managing the network connections but also power recycling the USB modems by controlling power on each USB hub outlet. Power recycling may be used to prevent the devices from overheating and ensuring continued long term uninterrupted operation of the setup.

Figure 5E:
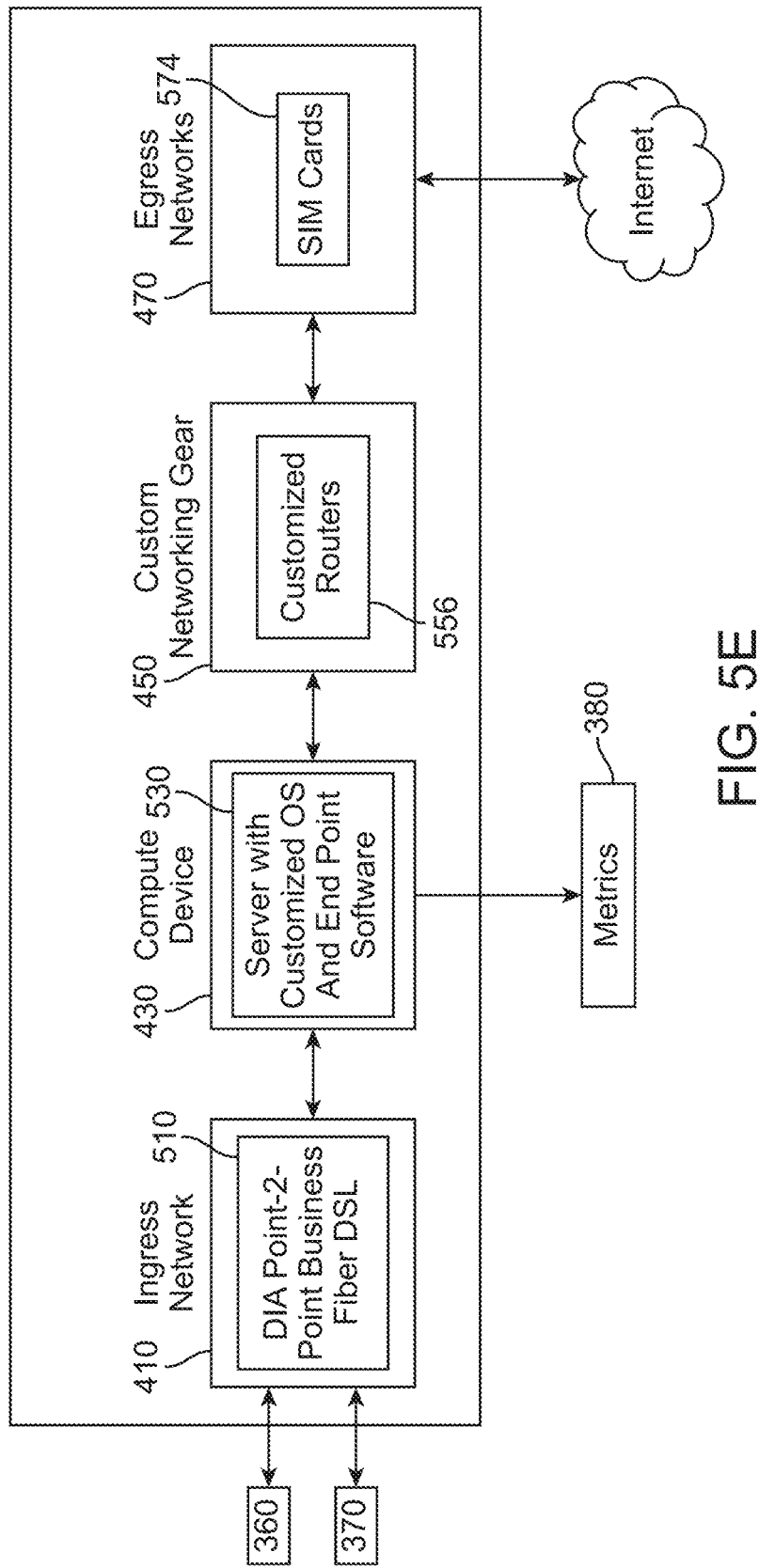

FIG. 5E illustrates an example endpoint using last mile mobile networks using customized routers 556 (e.g., type 5), according to some embodiments of the present disclosure. In this embodiment, mobile routers (e.g., from Cradle Point Systems®) may be customized to work with the compute devices. One or more mobile routers 574 may be configured for use with one or more SIM cards which provide the egress networks 470. The router 556 interfaces with the compute device 430 and allows the network connection manager 434 to control the management of these networks.

Figure 5F:
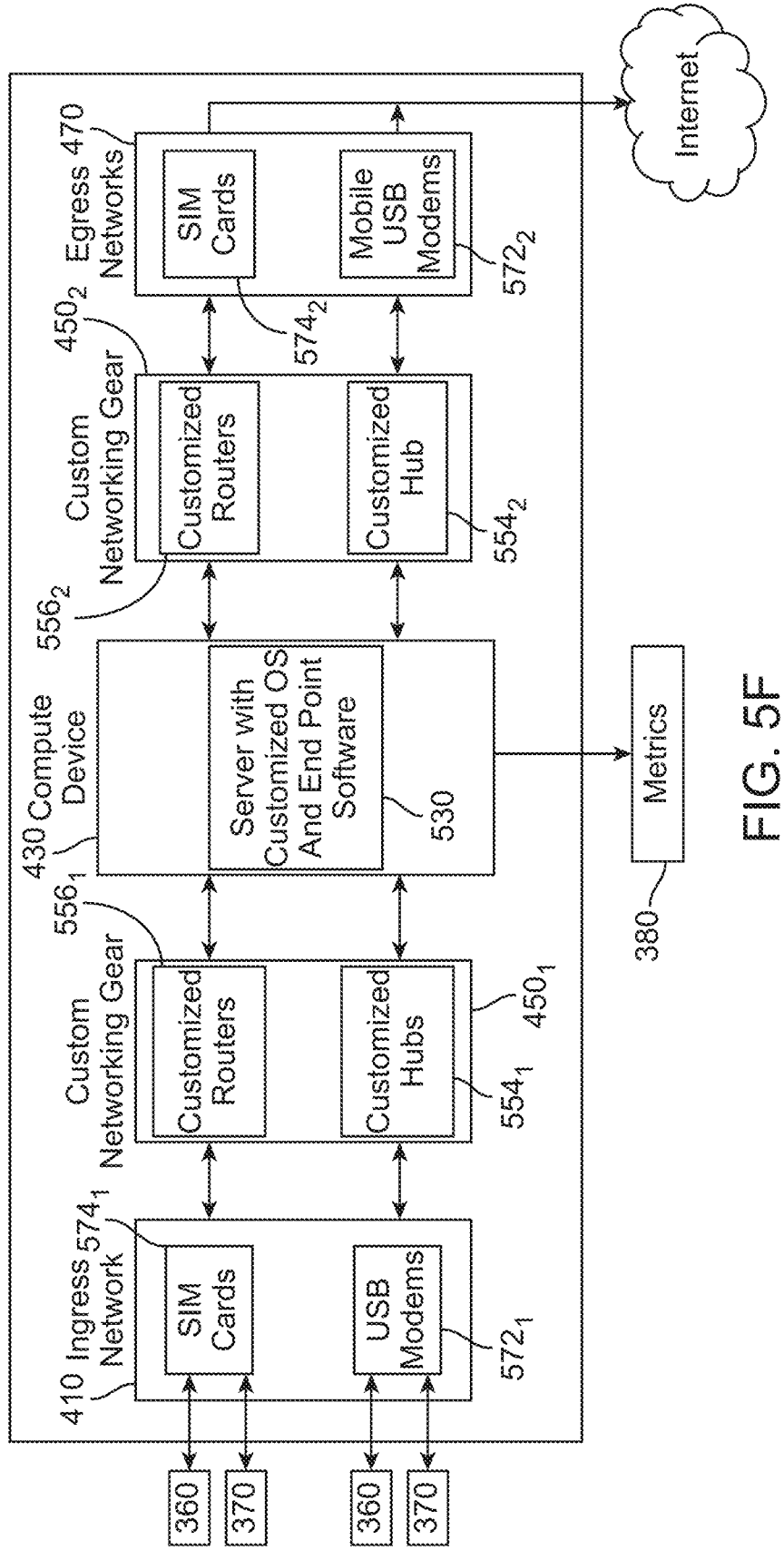

FIG. 5F illustrates an example endpoint using a complete wireless design with multiple types of custom networking gears 450 (e.g., type 6), according to some embodiments of the present disclosure. The present embodiment is a combination of type 4 and type 5 from FIGS. 5D-5E above, where both customized USB hubs 554 and mobile routers 556 can be used to provide multiple networks for the setup. As shown in FIG. 5F, the wired ingress networks 410 described in the type 4 and/or type 5 above can be replaced by mobile networks making this a completely wireless design with no wired networks whatsoever. The entire setup can be delivered as a preconfigured box and deployed across different geographies with SIM cards for different mobile providers available in the region.

Figure 5G:
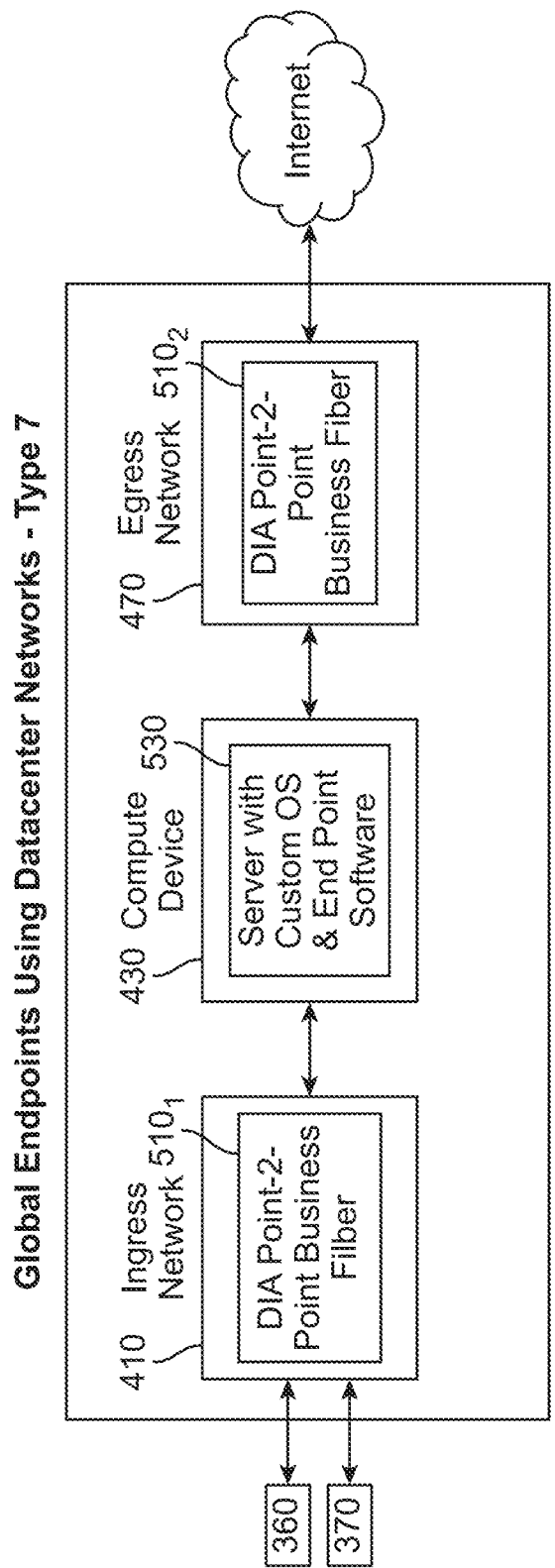

FIG. 5G illustrates an example endpoint using a wired datacenter/business network for ingress and egress (e.g., type 7), according to some embodiments of the present disclosure. This embodiment is a basic setup that can be delivered in datacenter locations easily and leverages wired datacenter/business networks which are widely available across datacenters around the world. Multiple DIA circuits, business fiber networks or point-to-point connections (e.g., 5101 and 5102) can be used to connect the endpoint to cloud routing platform on one side and the Internet on the other. These different networks may be directly connected to the server on multiple network interfaces and operating system configured to use different gateways and network configurations for routing ingress and egress traffic. As an additional configuration, multiple Ipv4 or Ipv6 addresses may be BGP announced by the routers of the ingress network 410. This allows creating of multiple virtual networks that can be configured as VLANs each with its own IP address on the servers. Ingress networks and VLANs may be managed by the network connection manager 434.

Figure 5H:
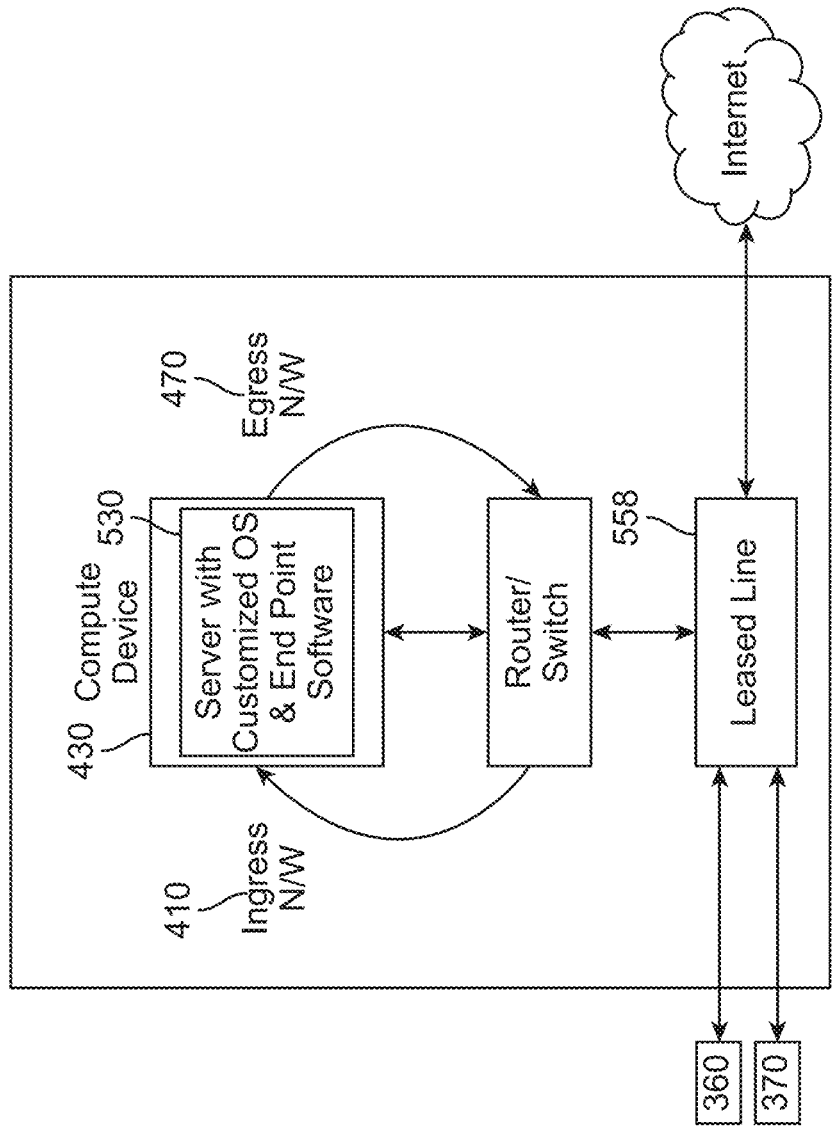

FIG. 5H illustrates an example endpoint using a single wired datacenter/business network for ingress and egress (e.g., type 8), according to some embodiments of the present disclosure. As a variation type 7 above in FIG. 5G, a single business grade network 558, such as, for example, a leased line may be virtually split using a network device like a router or a switch to create Ingress network 410 and Egress network 470 for the compute device 430. As an additional configuration, multiple Ipv4 or Ipv6 addresses may be BGP announced by the networking device for the ingress network. This allows creating of multiple virtual networks which can be configured as VLANs, each with its own IP address on the servers. The ingress network configuration and VLANs are managed by the network connection manager 434.

Figure 5I:
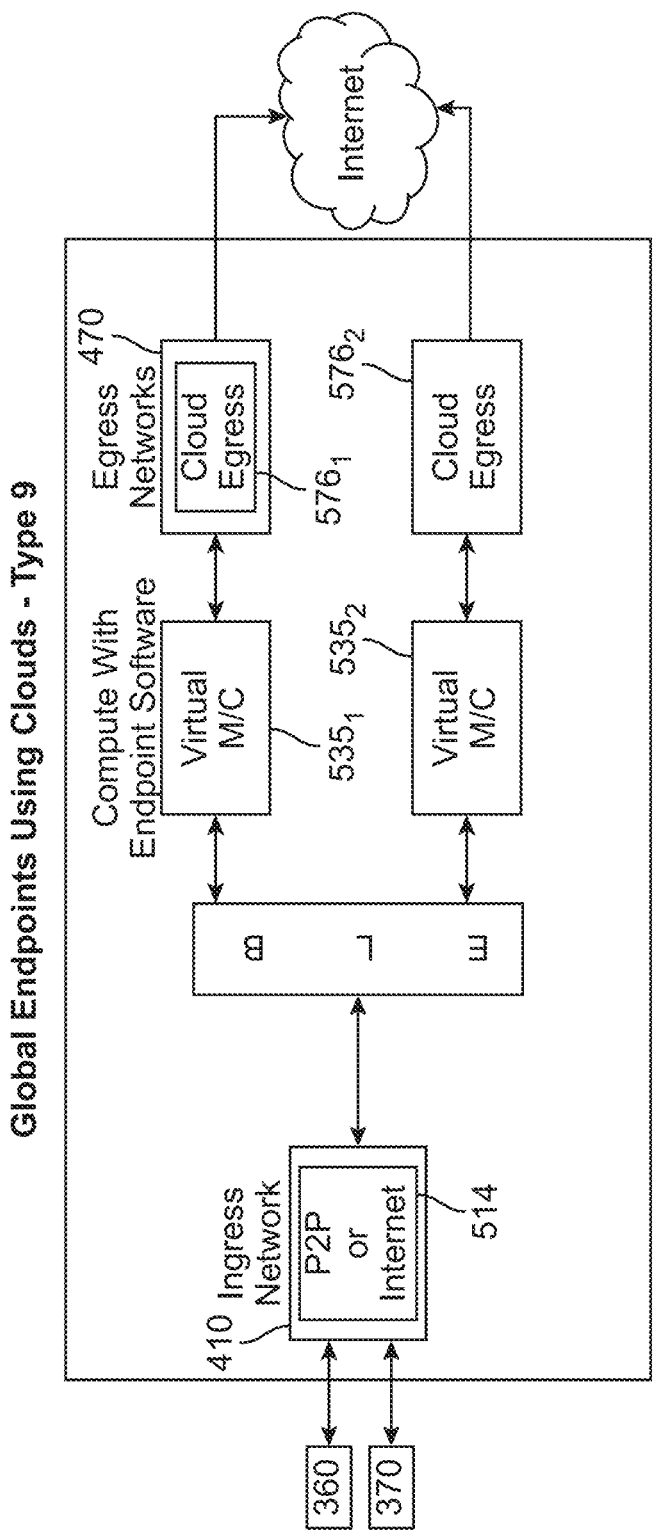

FIG. 5I illustrates an example endpoint using global endpoints using cloud networks and compute instances (e.g., type 9), according to some embodiments of the present disclosure. In this embodiment, virtual machines 535 provided by multiple cloud providers can be used for construction of an endpoint device. This is particularly useful where speed to setup is critical and sending custom equipment is not always feasible for foreign countries.

In this embodiment, one more virtual machines (VM) 535 provided by a provider can be created and managed by different cloud services. Each VM compute node 535 provides egress bandwidth using the cloud providers egress networks 576 and IP address for routing traffic. VM compute nodes 535 have highly optimized versions of operating system with the custom endpoint software (e.g., custom endpoint software 530) deployed on it. Machines may be fronted with a load balancer which usually acts as the point of entry for traffic from the Routing Platform (300). Routing Platform (300) may reach the ELB (Elastic Load Balancer) over point to point 514 within the ingress networks 410 into the setup or over the Internet, where the point to point 514 may be a networking software protocol and ingress networks 410 may be the networking hardware that communicatively connects a compute device running an instance of the endpoint software 530 with the routing platform. Load Balancer and associated cloud services may also be used to scale in and scale out the number of virtual machines in the setup based on the traffic coming into the setup. Security policies may also be deployed at Elastic Load Balance (ELB) and Virtual Machines to only allow authorized traffic from coming in and leaving the setup.

Figure 5J:
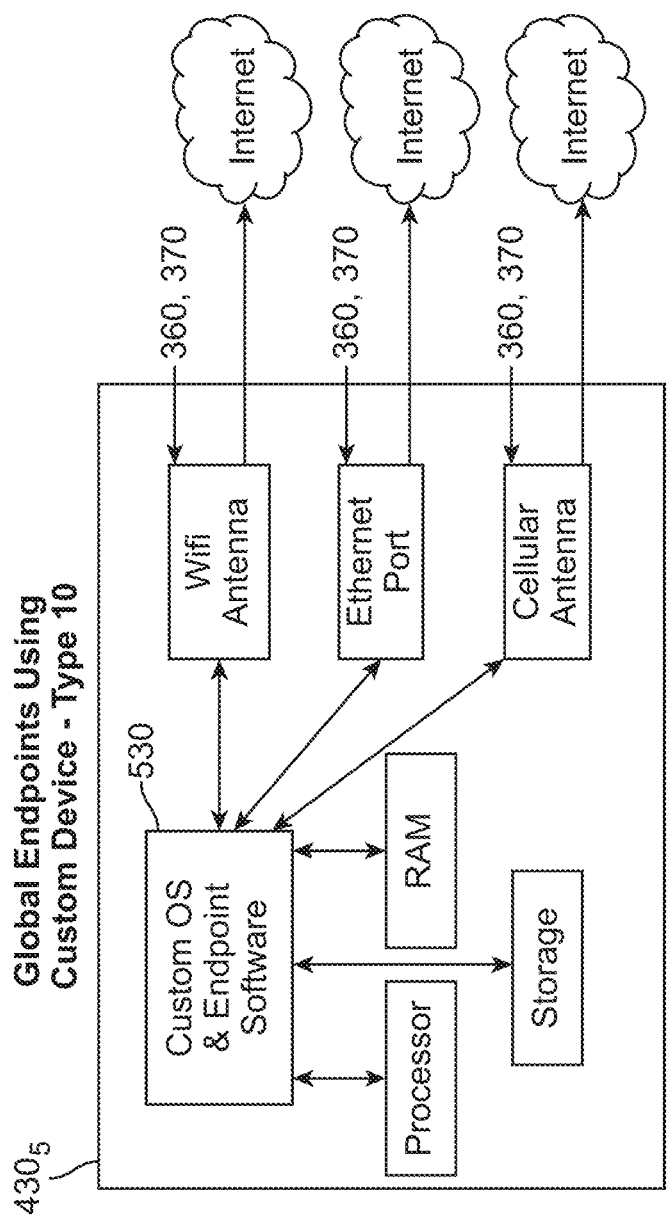
Figure 6A:
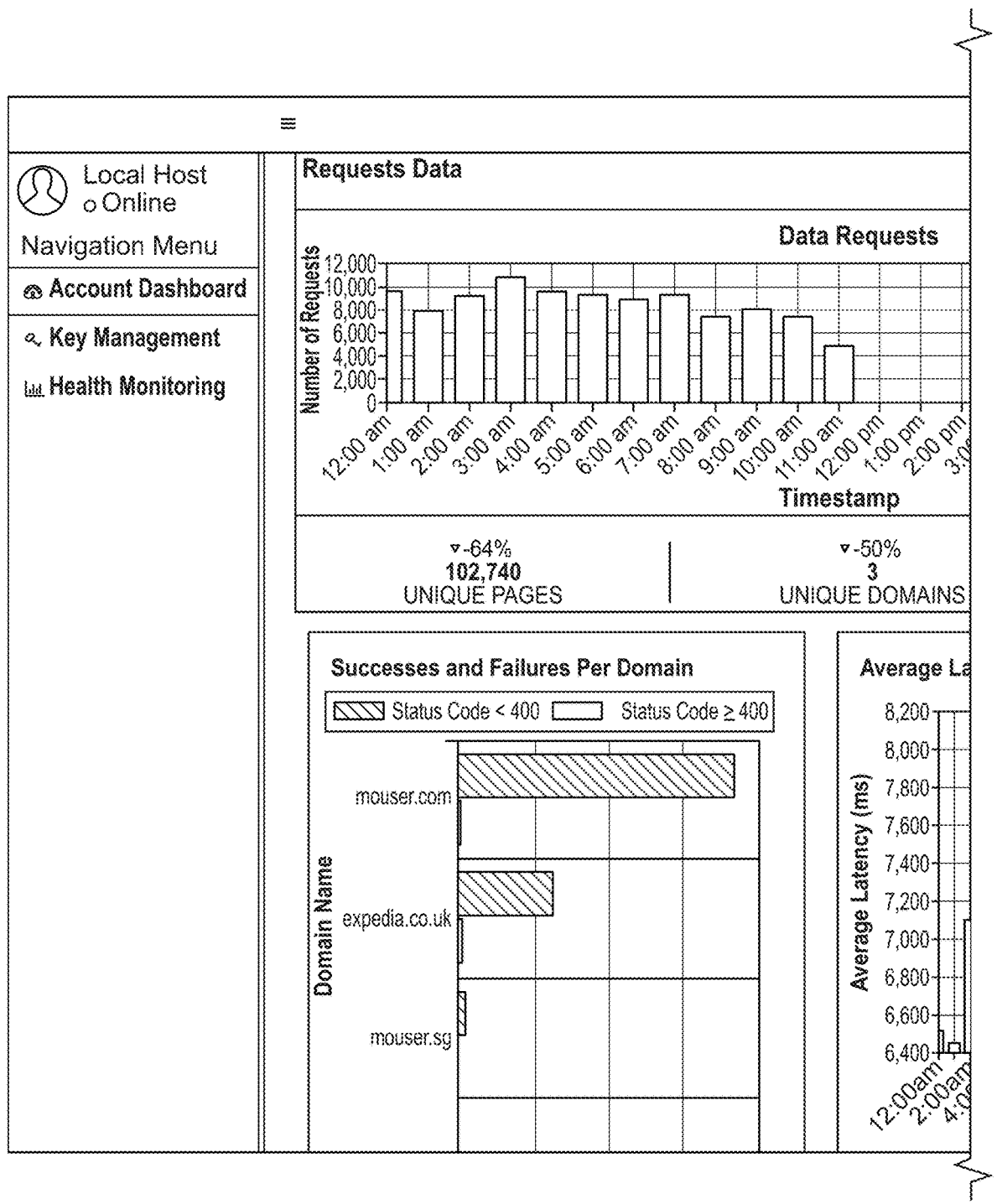
Figure 6A:
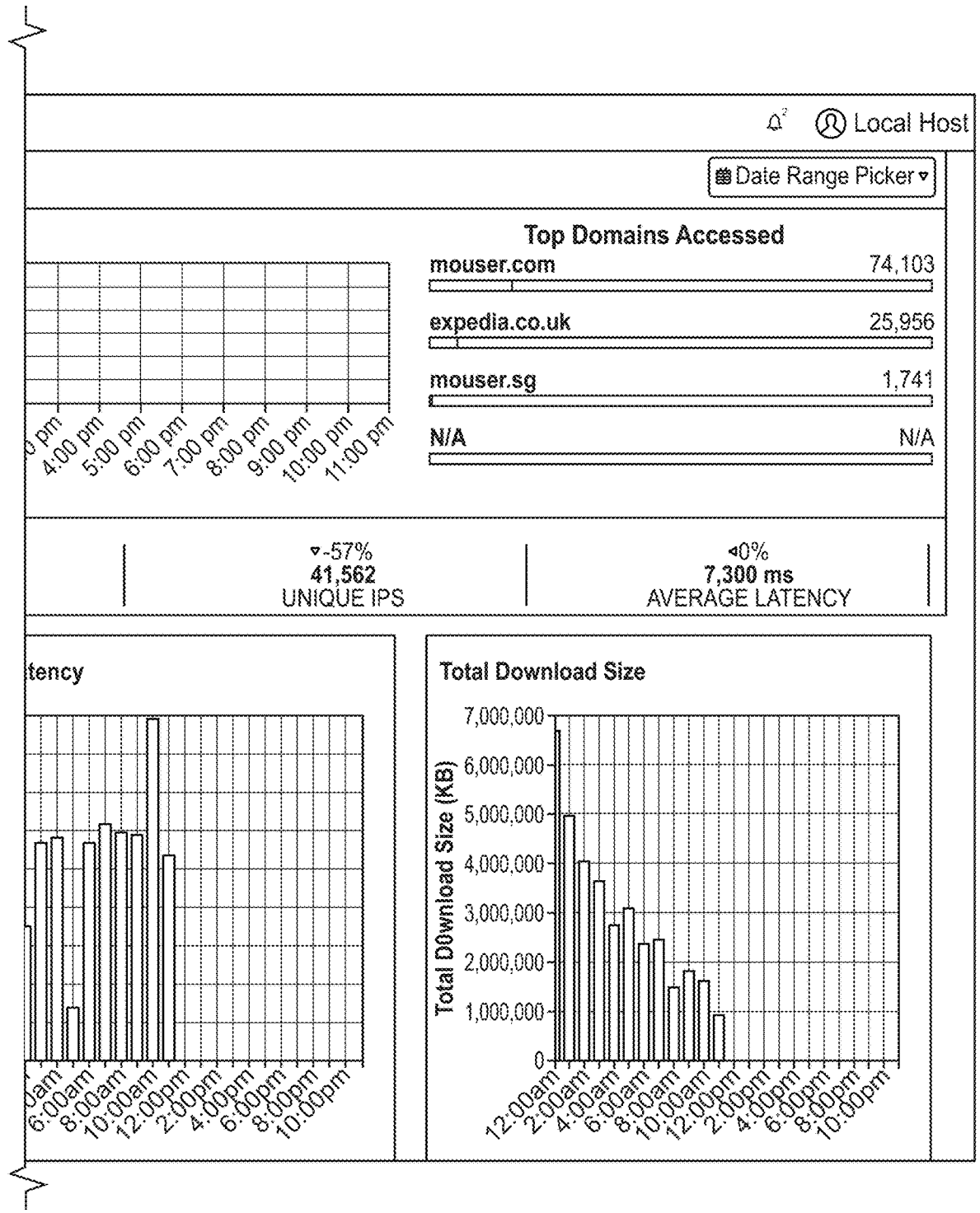
Figure 6B:
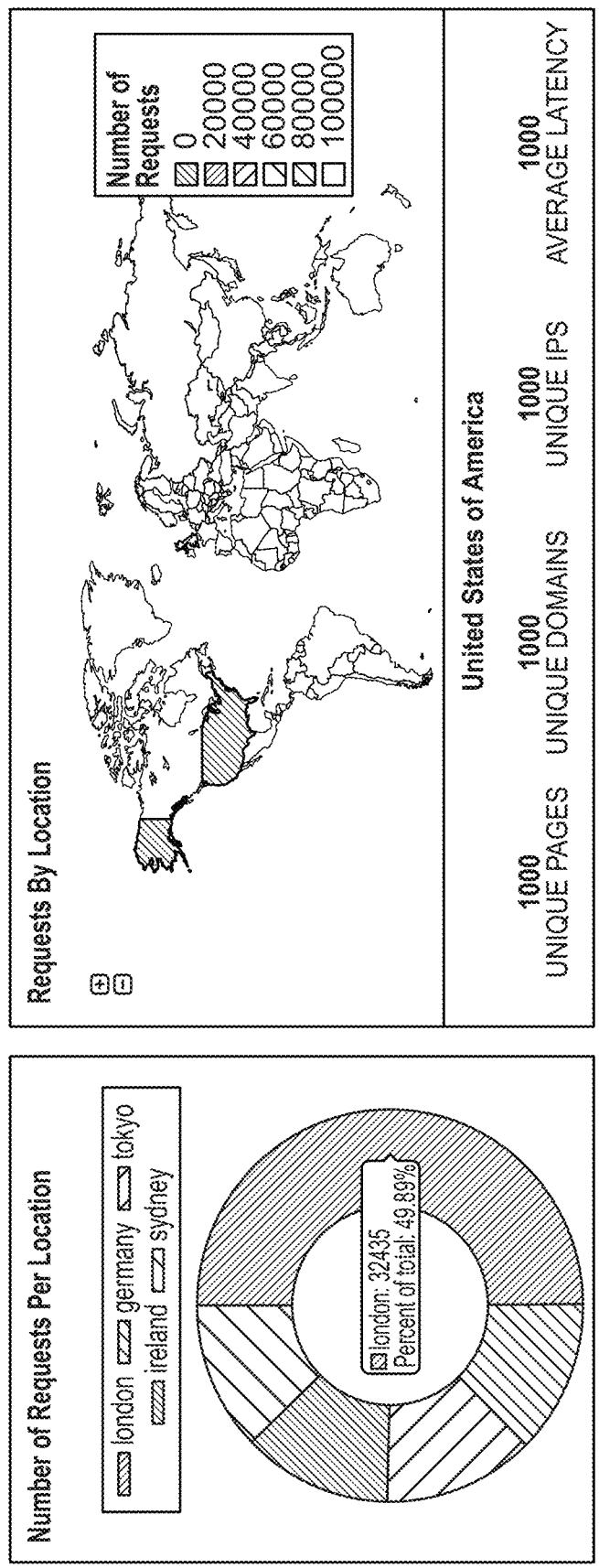
Figure 6D:
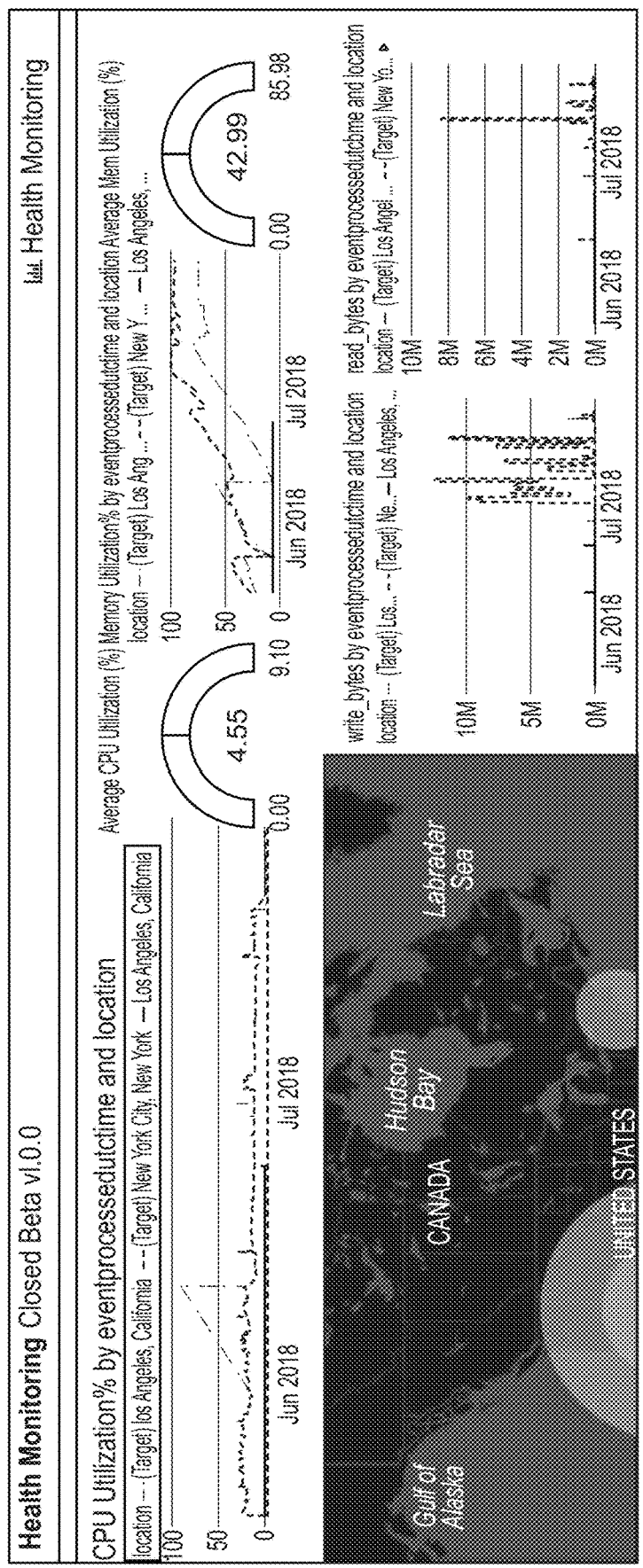

FIG. 5J illustrates an example endpoint using a portable custom-built hardware devices (e.g., type 10), according to some embodiments of the present disclosure. In this embodiment, a proprietary design for building low power consumption devices 4305 that can be deployed anywhere to act as an endpoint that can work with cloud routing platform 300. The major motivation for building this device is the ability to deploy an endpoint anywhere and not necessarily in datacenters and corporate office environments. Device 4305 may be a low cost, low power device that is much like a simple commodity WiFi-router in form factor and power consumption. Device 4305 may have processing power, RAM and storage along with a highly customized embedded operating system and the custom endpoint software 530. Furthermore, device 4305 may have hardware interfaces and software modules that allows it to use any local network available. This device may have a WiFi antenna that allows it to use existing WiFi in an area. It may have an ethernet port which can be used to connect any wired network like DSL line, Cable connection, home fiber or others like leased lines and corporate LANs. It may also have a SIM slot and a cellular antenna.

In some embodiments, device 4305 may be configured with multiple networks—like a WiFi connection, a wired Internet connection and mobile network—at the same time. Once configured to be used with a network, the device 4305 may use the same network for communicating with cloud routing platform 300 on the one hand, and also uses the same network as an egress network 470 to route incoming requests to the Internet. Custom software 530 performs the necessary functions as described in this disclosure to listen to incoming requests, modify them, send request out, process responses and send them back to the cloud routing platform 300. Additionally, the device 4305 may continue to emit health checks and communication with the health monitoring service 370.

In an alternative embodiment, the device 4305 may display options to configure the different networks. In general, the device may have a very simple configuration flow to allow users to plug any existing networks for use with the device 4305. For example, the WiFi configuration experience for a Custom device with display panel may be as simple as powering on the device; selecting a WiFi network from the available networks, entering a username/password for the WiFi network, entering an activation code supplied with the device, and executing the device as a standalone router receiving traffic from the cloud routing platform on one-side, while routing the traffic to a destination Application domains via WiFi and then then transmitting the results back to the cloud routing platform to be sent back to the Client.

In another embodiment, the device 4305 may not have a display panel to configure the different network. The user experience for a Custom device without display panel may include powering on the device 4305, attaching the device to a laptop using, as an example, a USB cable; launching a setup program on the laptop; selecting the network to be used from a device setup wizard displayed on the laptop and providing a username/password (optionally, the device 4305 may be configured using a dedicated Wireless Distribution System WDS channels); saving the details to the device; entering activation code of the device; testing routing on the internet via the wi-fi network using an option provided in the setup wizard; checking communication with cloud routing platform 300 using an option provided in the setup wizard; unplugging the device 4305 from the laptop; and executing the device to run as a standalone router receiving traffic from the cloud routing platform on one-side, while routing the traffic to the destination Application domain(s) via WiFi and then transmitting the results back to the cloud routing platform to be sent back to the Client.

Wired internet configuration and Mobile connection configuration for a custom device endpoint 430, may be similar in experience except for the number of configuration options a user may be to provide inputs for during the configuration. For example, PPPOE username/password along with other connection parameters for mobile or DSL line. Overall this device may simplify provisioning of new endpoints and could be deployed in anywhere with little space, standard power and an available network. The processing power of these devices may be limited compared to the other designs but collectively a large fleet of such devices may provide the regional diversity, geo location coverage, network diversity, IP diversity and collective bandwidth that may be prohibitively expensive to achieve with other embodiments.

In another embodiment, a custom endpoint software may also be containerized and deployed on any machine connected to any network (e.g., type 11). A containerized image may allow deployment on machines across multiple operating systems. These machines can be servers, desktops or even laptops connected to any network. Once deployed it may use the same network communication with the cloud routing platform 300 and routing traffic to the Internet as the egress network. This is particularly useful for deployment within corporate networks or situations where other types of endpoints cannot be deployed.

FIGS. 6A-6E are example graphical user interfaces of a dashboard for managing access to network presence platform, monitoring usage, reviewing results and other operations, according to some embodiments of the disclosure. Dashboard 800 may be a user interface available for users for performing at least the following operations: (1) Signing up and account management. This includes initial account creation for a business organization. Subsequently multiple user accounts can be created for that organization including mapping to different teams within the organization. (2) API key management—One or more API keys can be created for multiple teams of a business organization or mapped to different individual user accounts using this feature. (3) Defining custom rules that will be used by Platform via Custom rules engine 303. (4) Viewing of different metrics for user traffic—Users can view a lot of different metrics that are collected about the traffic that they have routed using the Platform. This includes both the request and response metrics and parameters. Top metrics like number of requests, top destinations, download bandwidth etc. are aggregated and made available for quick viewing. Users may also have access to a lot of additional raw data can be sliced and diced for analysis and exported into different formats. (5) Downloading of different client software such as, for example, different SDKs for different programming languages and browser extension. (6) Support—Users can use the support functionality with the dashboard to check the availability and uptime of different Services like the cloud routing platform 300 and different global endpoints 400 made available to the users under their subscription plan. Additionally, users can create and manage support tickets for getting help from the support engineering teams on any issues they are facing.

ADDITIONAL EMBODIMENTS OF THE DISCLOSURE

Additional Practical Application Examples

In some embodiments, the following assumptions are disclosed to further clarify certain use cases available for practicing the present embodiments. A customer may be a retailer with an online ecommerce site and physical brick and mortar stores. The retailer may have 50 department stores in cities across U.S.A. A user of the Platform may be a developer working on the retailer's development team. A developer may build a client program (e.g., clients 200) using an SDK to call the Platform via the API using a set of API keys. The cloud routing platform 300 and API 115 that interacts with client requests are deployed on the public cloud. The following global endpoints 400 may exist: custom hardware device (e.g., custom hardware device 4305) may be deployed as an endpoint in all of the 50 brick and mortar department stores in cities across the U. SA. The custom hardware devices may use the WiFi network and LAN connection available in the stores such that the WiFi is used as the ingress network to the custom hardware device 4305 and the LAN is used for egress network. Furthermore, endpoints using mobile connections and wired consumer networks like DSL, Cable and Home fiber exist in datacenters across the top 20 cities where the ecommerce site receives the most traffic from. Therefore, in total, 70 endpoints exist that may be configured to operate with the cloud routing platform. In some embodiments, some of these endpoints may exist in the same city. The following two use cases will be disclosed with respect to the aforementioned scenario as background information.

For the first use case, a developer may want to test a performance of a login page of an internal enterprise application from in-Store Networks in all store locations.

In this first use case, the developer has created an enterprise application for store employees that can be accessed from in-Store Networks. The developer needs to check if the application can be accessed from all stores. The developer wants to log into the application from an in-store network and perform some basic operations using the application and log out.

The developer makes an API call using the SDK in a program (e.g., client 200) where the developer provides the information to generate a request (e.g., request 210), the request comprising: a destination URL of the application which needs to be accessed from the store, details of the in-Store endpoint to be used, a protocol such as, an example, an HTTP(s) to be used in the request, and additional parameters such as HTTP headers, Method (GET/POST) that should be used for sending the request from the endpoints to the Application at the destination.

The API request may, as an example, include sample code such as:

```
{
  "Destination": "https://www.internalapplication/login"
  "Endpoint-List": {"Country": "USA", "City":"City1", "Name":"Store-1"},
  "Network-Type": {"Wired-LAN"}
  "Protocol": "HTTPS"
  "Request-Metadata":
  {
    Headers
    {
      "Method":"GET"
```

```
      "Content-Type: application/x-www-form-urlencoded"
    }
  }
  "IP-Type": "IPv4"
  "Virtual-Circuit": "Null"
  "API-Key": "XXXXXXXXXXXXXXXXX"
}
```

Once the request is received by the cloud routing platform 300, the following processing steps may take place by the different software modules configured within the cloud routing platform 300. For example, authentication and authorization 310 may authenticate and authorize the request using the API-Key of the user/developer. The traffic filter 320 may check the destination against filters to make sure the request is a valid request. Once the traffic filter determines the request is valid, the traffic filter passes the request to a traffic shaper 330. The traffic shaper 330 may rate limit the request and pass along the request. For example, Clients may only be allowed to send traffic at a certain baseline TPS (Transactions per second). Incoming requests may be checked to see if a baseline is breached. In case of a breach, the DDOS detection 334 may analyze the current request in relations to historical requests executed within, as an example, a 24-hour period to detect any DDOS attack patterns. Rejections with prescribed/allowed request rates may be sent back to the Clients.

Next, the Path selector 340 may analyze the request and determine the endpoint and the specific network within the endpoint that needs to be used to route the request. The output of the path selector 340 may be a list of endpoint and network information that may be used to fulfil the request. This information (e.g., network path) may be stamped on the original request received and sent to virtual circuit manager 350. Virtual circuit manager 350 may create a unique identifier for the request and stamp the unique identifier (e.g., virtual circuit ID) on the request+path information created by the path selector 340. Creation of the virtual circuit indicates a promise from the Platform that resources like bandwidth, IP addresses and network are marked and allocated for fulfilling the request. Request response handler 360 looks at the virtual circuit information, request properties and paths supplied. Request response handler 360 then sends requests with the virtual circuit information over the network paths computed.

Additionally, the compute device 430 with custom endpoint software 530 of an endpoint 400 may process the incoming requests by identifying a network to use (e.g., egress network) for executing the request, creating an HTTP (s) request can that be executed by the endpoint by removing proprietary information that, as an example, may be used by the Platform to uniquely identify the request throughout the Platform. The proprietary information may include, for example, the virtual circuit information, custom headers and metadata, and sending the HTTP(s) out of LAN network connected to the custom hardware device. The compute device 430 with custom endpoint software 530 then gathers the response from the destination application/website along with any performance metrics using the LAN network. The response and performance metadata may be collated. The collated response and performance metadata are then stamped with the virtual circuit ID and sent back to the cloud routing platform 300. The following is an example approach to implement a formatted response.

```
{
"Virtual-Circuit": "XYZEXE"
"Response": "Response1"
    {
    {"Country": "USA", "City":"City1", "Name":"Store-1"}
        {"Network-Type": "Wired-LAN", "Carrier": "Verizon"}
        {"Response Code":"200", "Time to Download":"2sec",
        "TTFB":}
        {............................................................................}
    }
}
```

The cloud routing platform 300 may then send the formatted response back to the client with further modification. The developer at this time can choose to send another request using the same virtual circuit to perform some operations in the application. The following is an example of a request that may be received by the routing platform for executing another request using the same virtual circuit ID.

```
{
    "Destination": https://www.internalapplication/homepage
    "Protocol": "HTTPS"
    "Request-Metadata":
        {
        Headers
            {
            "Method":"POST"
            "Content-Type: application/x-www-form-urlencoded"
            "Parameter1":"Value1"
            "Parameter2:"Value2"
            }
        }
    "Virtual-Circuit": "XYZEXE"
    "API-Key": "XXXXXXXXXXXXXXXXX"
}
```

This request will use the same routing parameters as the original request automatically because of the reference to virtual circuit information. The same network and IP address will be used to execute this second request. Note that every virtual circuit has a TTL associated with it. While the TTL has not expire, the developer can send another request and the Platform promises to allocate the necessary resources such as bandwidth, IP addresses and networks to fulfill any subsequent requests. As these new requests travel through the different system components, the promised resources are made available for executing them. Subsequently, the developer can perform a logout operation, thus running a whole HTTP transaction on an application using the same virtual circuit. The developer can choose to explicitly tell the Platform to terminate the virtual circuit by issuing a termination request or leave it to the Platform to recycle it after its TTL.

In the first use case above, the developer uses a remote network endpoint without understanding the hardware and networking complexities to run an HTTP transaction test using virtual circuits. The developer can repeat the exercise from different stores or run the same transaction from different stores at the same time. Metrics from the system components and subsystem components are gathered and stored with virtual circuit information for future debugging and troubleshooting.

For the second use case, a developer may want to test a performance of a new page launched on the ecommerce website using the same in-Store endpoints from 20 different cities In this second use case, the developer has launched a new page on the website. The developer wants to measure the user experience for this page from the top 20 cities where most user traffic is expected to come from.

The developer may make a single API call using the SDK in a program (e.g., client 200) where the developer provides information to generate a request, (e.g., request 210), the request comprising: a destination URL which needs to be accessed from each of the 20 cities where most consumers log in from, a list of specific destination endpoint locations or cities to be used for routing this traffic to the destination URL, additional parameters such as specific endpoint network types or network types to be used for sending the traffic, a protocol such as an HTTP(s) to be used, and additional parameters such as HTTP headers, Method (GET/POST) that should be used for sending the request from the endpoints.

The API request may, as an example, may be formatted as follows.

```
{
    "Destination": "https://www.samplestore/testpage"
    "Endpoint-List":
        {
        {"Country": "USA", "City":"City1", "Name":
"Specific  Endpoint Name"},
        {"Country": "USA", "City":"City2"},
        ................
        ................
        {"Country": "USA", "City":"City20"},
        }
    {"Network-Type": "DSL", "Cable", "Fiber", "Mobile"}
    "Protocol": "HTTPS"
    "Request-Metadata":
        {
        Headers
            {
            "Method":"GET"
            "Content-Type: application/x-www-form-urlencoded"
            }
        }
    "IP-Type": "IPv4"
    "Virtual-Circuit": "Null"
    "API-Key": "XXXXXXXXXXXXXXXXX"
}
```

Once this request is received by the cloud routing platform 300, the following processing takes place by the cloud routing platform 300:

Authentication and authorization 310 authenticate and authorize the request using the API-Key of the user/developer. Traffic filter 320 checks the destination against filters and passes the request along. Traffic shaper 330 ignores shaping, assuming this request is being sent for the first time. Path selector 340 determines that the request needs to be sent over to the 20 cities. The path selector 340 also determines the kind of networks that need to be used for routing the traffic. In this case, the developer may want to test the performance using mobile and wired networks available in an endpoint in all the respective cities. Where specified, the developer may also specify specific endpoints from multiple endpoints available within a city. Alternately, the path selector may make the most optimal choice while selecting endpoints and networks for routing requests. The output of the path selector 340 is a list of endpoints and network information that needs to be used to fulfil the request. This is stamped on the original request received and sent forward to virtual circuit manager 350.

Virtual circuit manager 350 creates a unique identifier for the request and stamps this on the request+path information created by the path selector 340. Creation of virtual circuit indicates a promise from the Platform that resources like bandwidth, IP addresses and network are marked and allocated for fulfilling the request. Request response handler 360 looks at the virtual circuit information, request properties and paths supplied. Request response handler 360 then sends duplicate requests with the virtual circuit information over the network paths computed.

On the endpoints 400, compute device 430 with custom endpoint software 530 processes the incoming requests by: identifying the network that should be used for executing the request, creating an HTTP(s) request can that be executed on the endpoint by removing proprietary information such as, for example, the virtual circuit information, custom headers and metadata, and sending the HTTP(s) out of the multiple wired and mobile networks attached to the endpoint. The compute device 430 with custom endpoint software 530 then gathers the response from the destination application/website along with any performance metrics using the LAN network. The response and performance metadata may be collated. The collated response and performance metadata are then stamped with the virtual circuit ID and sent back to the cloud routing platform 300. An example of the collated response and performance metadata is reproduced below:

```
{
"Virtual-Circuit": "Abcdced"
"Response": "Response1"
    {
        {"Country": "USA", "City":"City2"}
            {"Network-Type": "Mobile", "Carrier": "Verizon", "Type":
            "3G"}
                {"Response Code":"200", "Time to Download":"2sec",
                "TTFB":}
                    {............................................................}
            }
..........................
..................
"Response": "Response5"
    {
        {"Country": "USA", "City":"City5"}
            {"Network-Type": "Cable", "Carrier": "Comcast"}
                {"Response Code":"200", "Time to Download":"2sec",
                "TTFB":}
                    {............................................................}
            }
}
```

Multiple such responses from different endpoints are collected by response handler 360 and collated using the virtual circuit ID. The final response is then sent back to the client which has detailed information about the page performance from different consumer networks from the 20 different cities.

In some embodiments, a custom engineered environment is disclosed using a combination of computational devices (e.g., compute devices) with special endpoint software, networking elements (e.g., switches and routers) and one or more types of networks configured for use along with the computational devices. Many endpoints may be pre-provisioned in geographically distributed locations to provide remote networks for implementing a global network presence SaaS platform. Endpoints may be designed to be stateless routers that work with a routing platform to accept and execute user requests to destination Applications using existing networks in a given endpoint. Collected responses from the Applications may be sent back to the routing platform to be provided to clients wishing to emulate end-user interaction with the Applications from a particular geographical location using particular types of networks and protocols to interact with the Application. To achieve this custom engineered environment, endpoints with compute devices which may be physical or virtual servers running a special endpoint software may be provisioned. In some embodiments, a custom hardware device capable of running the endpoint software may also be used for implementing an endpoint.

An ingress network may be configured for use along with the endpoint that allows the endpoint to communicate with a cloud routing platform to receive requests for execution of operations to be performed on Applications (e.g., Applications 160) from specific geographical locations. The ingress network may also receive responses received from the endpoints as a result of the execution of the operations such that the received responses are sent from the endpoint to the cloud routing platform via the ingress network. Networking elements such as servers and/or switches may be configured for use with the compute device. One or more egress networks may be configured with networking elements for use as exit networks for the endpoint software to execute client requests on destination Applications.

The endpoint software may communicate with the cloud-based routing platform on a regular basis to submit its health, uptime, and resource availability information for executing client requests. This information may be used by components/modules within the cloud-based routing platform for determining which endpoints should be selected for client requests. In some embodiments, the endpoint software may strip custom information such as, an example, headers and virtual circuit information, formatting requests to be sent to destination application via egress networks identified in the virtual circuit information. Endpoints executing a client request may send the client request out of an egress network. In some embodiments, an endpoint may emulate end-user actions while executing a request by programmatically simulating mouse clicks, scrolls, etc. for a website.

What has been disclosed is an approach for a scalable network presence platform. This includes setting up or pre-provisioning smart network endpoints across the globe which are engineered to support multiple protocols for supporting multiple customer segments and their use cases. These endpoints employ multiple types of enterprise grade and consumer grade network connections. These endpoints are fronted by a cloud-based routing platform and then exposed via a simple software application programming interface ("API") that abstracts the complexities of hardware engineering and networking. The distributed system may comprise a cloud routing platform and one or more endpoints that are exposed via an API. The API may be called within any customer application or program to provide network presence globally without individual users provisioning any hardware or networks. Additionally, the Platform, via the API, also provides developers and integrators granular software defined control of how their respective traffic should be routed via the different endpoints and leverage platform provided features for traffic shaping. Developers may access the API either using the software development kits ("SDKs") provided in one of many different languages or Internet browser extensions.

System Architecture

Figure 7:
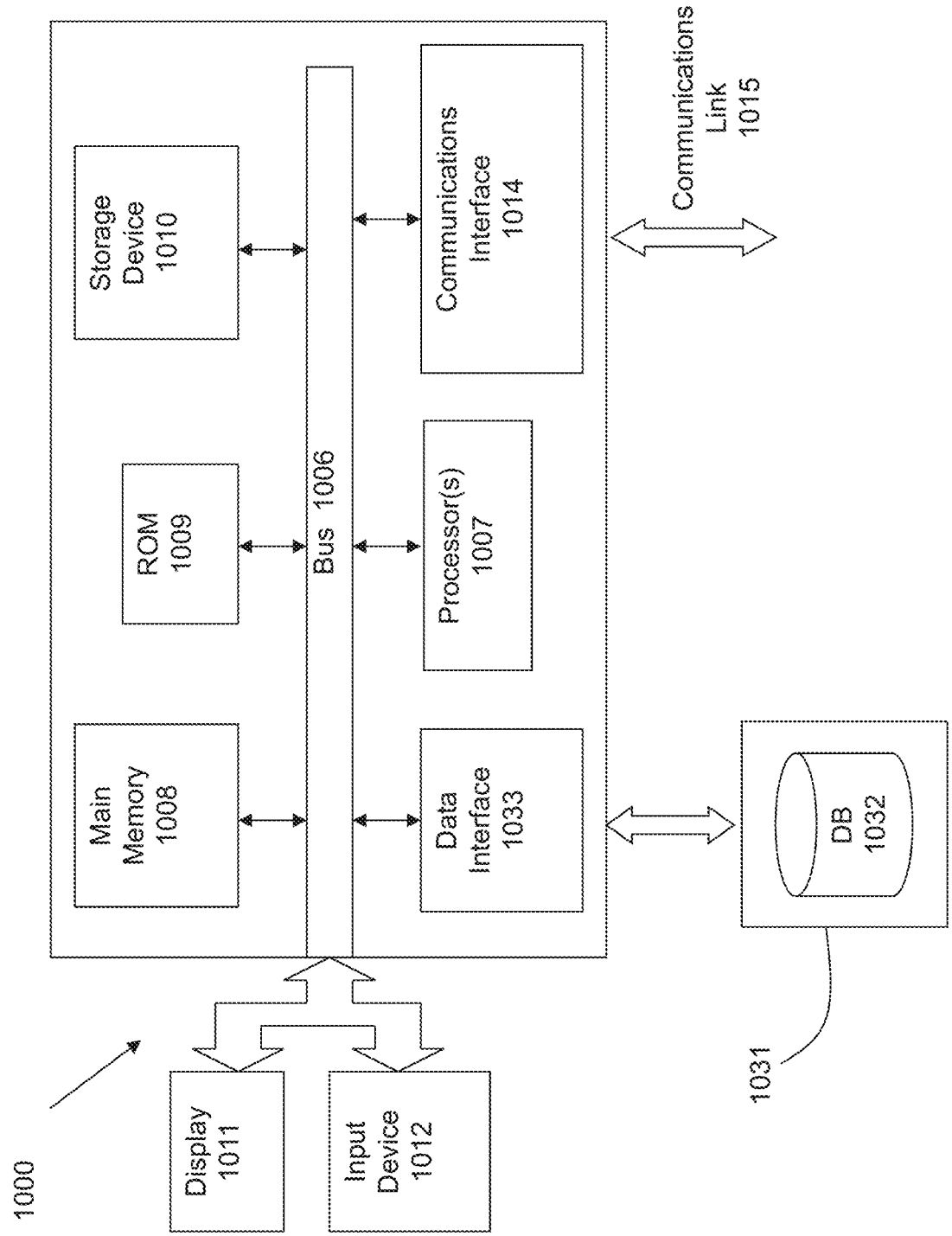
FIG. 7 is a block diagram of a computing system suitable for implementing an embodiment of the present disclosure.

FIG. 7 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

What is claimed is:

1. A method for accessing a remote application from a different location than a location of a client application, the method comprising:
   provisioning a plurality of network endpoints at respective geographic locations;
   receiving a first request from the client application specifying a geographic location, wherein the first request is to setup a virtual circuit between the client application and a corresponding network endpoint for use in collecting geo-location specific data at the geographic location;
   selecting, in response to receiving the first request, a network endpoint from the plurality of network endpoints provisioned at the respective geographic locations, wherein the network endpoint at a given geographic location is selected based on at least a correspondence to the geographic location specified by the first request;
   selecting, in response to receiving the first request, a route to send traffic via the geographical location to the selected network endpoint;
   establishing, in response to receiving the first request, the virtual circuit to route one or more requests between the client application and the selected network endpoint, wherein the virtual circuit comprises at least the selected route and the selected network endpoint and is identified by a virtual circuit ID;
   sending the virtual circuit ID to the client application in response to the first request;
   receiving a second request having the virtual circuit ID and an instruction to be executed by the selected network endpoint to access the remote application;
   sending, to the selected network endpoint, the instruction to be executed by the selected network endpoint using the virtual circuit;
   collecting a response received from the selected network endpoint corresponding to execution of the instruction to access the remote application; and
   forwarding the response to the client application using the virtual circuit ID.

2. The method of claim 1, wherein the geo-location specific data is provided by the remote application or by measuring geo-specific application performance using different protocols.

3. The method of claim 1, wherein the second request comprises: an application programming interface (API) key, a protocol for executing the second request, and an endpoint to execute the second request.

4. The method of claim 1, wherein the virtual circuit ID includes information identifying a client, an endpoint destination, and a parameter for controlling routing of the instruction, and wherein the virtual circuit ID is a unique identifier.

5. The method of claim 1, wherein the virtual circuit is stateless.

6. The method of claim 1, wherein the selected network endpoint is a remote self-contained system having computational power, storage, network elements and a locally available network configured for accessing the remote application from the geographical location of the selected network endpoint.

7. The method of claim 6, wherein the locally available network in the selected network endpoint is a mobile network.

8. The method of claim 6, wherein the locally available network in the selected network endpoint is a consumer grade network.

9. The method of claim 1, wherein the client application is associated with plurality of virtual circuits.

10. The method of claim 1, further comprising:
    receiving another request having the virtual circuit ID and another instruction to be executed by the selected network endpoint to access the remote application;
    sending, to the selected network endpoint, the other instruction to be executed by the selected network endpoint using the virtual circuit;
    collecting another response received from the selected network endpoint corresponding to execution of the other instruction to access the remote application; and
    forwarding the other response to the client application using the virtual circuit ID.

11. A non-transitory computer readable medium having stored thereon a set of instructions to execute a process for accessing a remote application from a different location than a location of a client application, the process comprising:

provisioning a plurality of network endpoints at respective geographic locations;

receiving a first request from the client application specifying a geographic location, wherein the first request is to setup a virtual circuit between the client application and a corresponding network endpoint for use in collecting geo-location specific data at the geographic location;

selecting, in response to receiving the first request, a network endpoint from the plurality of network endpoints provisioned at the respective geographic locations, wherein the network endpoint at a given geographic location is selected based on at least a correspondence to the geographic location specified by the first request;

selecting, in response to receiving the first request, a route to send traffic via the geographical location to the selected network endpoint;

establishing, in response to receiving the first request, the virtual circuit to route one or more requests between the client application and the selected network endpoint, wherein the virtual circuit comprises at least the selected route and the selected network endpoint and is identified by a virtual circuit ID;

sending the virtual circuit ID to the client application in response to the first request;

receiving a second request having the virtual circuit ID and an instruction to be executed by the selected network endpoint to access the remote application;

sending, to the selected network endpoint, the instruction to be executed by the selected network endpoint using the virtual circuit;

collecting a response received from the selected network endpoint corresponding to execution of the instruction to access the remote application; and forwarding the response to the client application using the virtual circuit ID.

12. The computer readable medium of claim 11, wherein the geo-location specific data is provided by the remote application or by measuring geo-specific application performance using different protocols.

13. The computer readable medium of claim 11, wherein the second request comprises: an application programming interface (API) key, a protocol for executing the second request, and an endpoint to execute the second request.

14. The computer readable medium of claim 11, wherein the virtual circuit ID includes information identifying a client, an endpoint destination, and a parameter for controlling routing of the instruction, and wherein the virtual circuit ID is a unique identifier.

15. The computer readable medium of claim 11, wherein the virtual circuit is stateless.

16. The computer readable medium of claim 11, wherein the selected network endpoint is a remote self-contained system having computational power, storage, network elements and a locally available network configured for accessing the remote application from the geographical location of the selected network endpoint.

17. The computer readable medium of claim 16, wherein the locally available network in the selected network endpoint is a mobile network.

18. The computer readable medium of claim 16, wherein the locally available network in the selected network endpoint is a consumer grade network.

19. The computer readable medium of claim 11, wherein the client application is associated with plurality of virtual circuits.

20. The computer readable medium of claim 11, wherein the process further comprises:

receiving another request having the virtual circuit ID and another instruction to be executed by the selected network endpoint to access the remote application;

sending, to the selected network endpoint, the other instruction to be executed by the selected network endpoint using the virtual circuit;

collecting another response received from the selected network endpoint corresponding to execution of the other instruction to access the remote application; and forwarding the other response to the client application using the virtual circuit ID.

21. A computer system for accessing a remote application from a different location than a location of a client application, comprising:

a computer processor to execute a set of instructions; and a memory to hold the set of instructions, in which the set of instructions, when executed by the computer processor, causes a set of acts comprising:

provisioning a plurality of network endpoints at respective geographic locations;

receiving a first request from the client application specifying a geographic location, wherein the first request is to setup a virtual circuit between the client application and a corresponding network endpoint for use in collecting geo-location specific data at the geographic location;

selecting, in response to receiving the first request, a network endpoint from the plurality of network endpoints provisioned at the respective geographic locations, wherein the network endpoint at a given geographic location is selected based on at least a correspondence to the geographic location specified by the first request;

selecting, in response to receiving the first request, a route to send traffic via the geographical location to the selected network endpoint;

establishing, in response to receiving the first request, the virtual circuit to route one or more requests between the client application and the selected network endpoint, wherein the virtual circuit comprises at least the selected route and the selected network endpoint and is identified by a virtual circuit ID;

sending the virtual circuit ID to the client application in response to the first request;

receiving a second request having the virtual circuit ID and an instruction to be executed by the selected network endpoint to access the remote application;

sending, to the selected network endpoint, the instruction to be executed by the selected network endpoint using the virtual circuit;

collecting a response received from the selected network endpoint corresponding to execution of the instruction to access the remote application; and forwarding the response to the client application using the virtual circuit ID.

22. The computer system of claim 21, wherein the geo-location specific data is provided by the remote application or by measuring geo-specific application performance using different protocols.

23. The computer system of claim 21, wherein the second request comprises: an application programming interface (API) key, a protocol for executing the second request, and an endpoint to execute the second request.

24. The computer system of claim 21, wherein the virtual circuit ID includes information identifying a client, an endpoint destination, and a parameter for controlling routing of the instruction, and wherein the virtual circuit ID is a unique identifier.

25. The computer system of claim 21, wherein the virtual circuit is stateless.

26. The computer system of claim 21, wherein the selected network endpoint is a remote self-contained system having computational power, storage, network elements and a locally available network configured for accessing the remote application from the geographical location of the selected network endpoint.

27. The computer system of claim 26, wherein the locally available network in the selected network endpoint is a mobile network.

28. The computer system of claim 26, wherein the locally available network in the selected network endpoint is a consumer grade network.

29. The computer system of claim 21, wherein the client application is associated with plurality of virtual circuits.

30. The computer system of claim 21, wherein the set of acts further comprise:
  receiving another request having the virtual circuit ID and another instruction to be executed by the selected network endpoint to access the remote application;
  sending, to the selected network endpoint, the other instruction to be executed by the selected network endpoint using the virtual circuit;
  collecting another response received from the selected network endpoint corresponding to execution of the other instruction to access the remote application; and
  forwarding the other response to the client application using the virtual circuit ID.

* * * * *